US011308325B2

(12) United States Patent
McClernon et al.

(10) Patent No.: US 11,308,325 B2
(45) Date of Patent: Apr. 19, 2022

(54) SYSTEMS AND METHODS FOR PREDICTING REAL-TIME BEHAVIORAL RISKS USING EVERYDAY IMAGES

(71) Applicant: Duke University, Durham, NC (US)

(72) Inventors: Francis McClernon, Durham, NC (US); Matthew Engelhard, Durham, NC (US); Lawrence Carin, Durham, NC (US); Jason Oliver, Durham, NC (US)

(73) Assignee: Duke University, Durham, NC (US)

( * ) Notice: Subject to any disclaimer, the term of this patent is extended or adjusted under 35 U.S.C. 154(b) by 364 days.

(21) Appl. No.: 16/654,868

(22) Filed: Oct. 16, 2019

(65) Prior Publication Data

US 2020/0117901 A1 Apr. 16, 2020

Related U.S. Application Data

(60) Provisional application No. 62/867,952, filed on Jun. 28, 2019, provisional application No. 62/746,077, filed on Oct. 16, 2018.

(51) Int. Cl.
*G06K 9/62* (2006.01)
*G06K 9/00* (2022.01)
(Continued)

(52) U.S. Cl.
CPC ....... *G06K 9/00671* (2013.01); *G06K 9/6282* (2013.01); *G06K 9/6286* (2013.01);
(Continued)

(58) Field of Classification Search
CPC ............ G06K 9/00671; G06K 9/6282; G06K 9/6286; G06N 3/04; G06N 3/08;
(Continued)

(56) References Cited

U.S. PATENT DOCUMENTS 8,530,180 B2 * 9/2013 Desiderio ................ C12N 9/90
435/23
9,420,956 B2 * 8/2016 Gopalakrishnan ... A61B 5/0022
(Continued)

FOREIGN PATENT DOCUMENTS

CN 108251520 A * 7/2018
EP 2524220 A1 * 11/2012 ....... G01N 33/57423
(Continued)

OTHER PUBLICATIONS

Beckers J, et al., "Towards better mouse models: enhanced genotypes, systemic phenotyping and envirotype modelling," Nature Reviews Genetics. 10(6):371-380 (2009).
(Continued)

*Primary Examiner* — Mahendra R Patel
(74) *Attorney, Agent, or Firm* — Polsinelli PC

(57) ABSTRACT

A system includes a camera configured to generate image data and a computing device in electronic communication with the camera. The computing device includes at least one processor and is configured to receive, from the camera, one or more images representative of a location. The computing device is further configured to apply a trained classifier to the one or more images to classify the location into one of at least two risk categories, wherein the classification is based on a likelihood of a subject performing a target behavior based on presence of the subject in the location. The computing device is additionally configured to issue a risk alert responsive to the trained classifier classifying the location into a high-risk category.

16 Claims, 17 Drawing Sheets

(51) Int. Cl.
*G06N 3/08* (2006.01)
*G06N 3/04* (2006.01)
*G09B 19/00* (2006.01)
*G08B 7/06* (2006.01)

(52) U.S. Cl.
CPC .............. *G06N 3/04* (2013.01); *G06N 3/08* (2013.01); *G08B 7/06* (2013.01); *G09B 19/00* (2013.01)

(58) Field of Classification Search
CPC ........ G06N 20/20; G06N 3/0454; G08B 7/06; G08B 31/00; G09B 19/00; G09B 19/0092; G09B 23/28
USPC ........................................................ 382/156
See application file for complete search history.

(56) References Cited

U.S. PATENT DOCUMENTS

| | | | | |
|---|---|---|---|---|
| 10,341,377 | B1* | 7/2019 | Dell'Amico | G06N 20/20 |
| 2010/0021903 | A1* | 1/2010 | Johnson | C12Q 1/6883 |
| | | | | 435/6.11 |
| 2012/0141450 | A1* | 6/2012 | Salas Perez-Rasilla | |
| | | | | A61P 9/04 |
| | | | | 424/94.3 |
| 2013/0316926 | A1* | 11/2013 | Caffrey | C12Q 1/6886 |
| | | | | 506/9 |
| 2019/0207814 | A1* | 7/2019 | Jain | G06N 3/08 |
| 2020/0251213 | A1* | 8/2020 | Tran | G16H 50/70 |
| 2020/0297955 | A1* | 9/2020 | Shouldice | G16H 20/10 |
| 2020/0366959 | A1* | 11/2020 | Pau | H04N 21/23418 |
| 2021/0174958 | A1* | 6/2021 | Drake | G06N 20/10 |

FOREIGN PATENT DOCUMENTS

| | | | |
|---|---|---|---|
| KR | 101793775 B1 * | 11/2017 | |
| WO | WO-2006012356 A2 * | 2/2006 | ........... C12Q 1/6876 |

OTHER PUBLICATIONS

Esteva A, et al., "Dermatologist-level classification of skin cancer with deep neural networks," Nature, 542(7639):115-118 (2017).

Gascon M, et al., "Mental Health Benefits of Long-Term Exposure to Residential Green and Blue Spaces: A Systematic Review," International Journal of Environmental Research and Public Health. 12(4):4354-4379 (2015).

Insel TR, "Digital Phenotyping: Technology for a New Science of Behavior," Jama, 318(13):1215 (2017).

Kirk SF, et al., "Characterizing the obesogenic environment: the state of the evidence with directions for future research," Obesity Reviews. 11(2):109-117 (2010).

McClernon FJ et al., "Hippocampal and Insular Response to Smoking-Related Environments: Neuroimaging Evidence for Drug Context Effects in Nicotine Dependence," Neuropsychopharmacology, 41(3):877-885 (2015).

Mohr DC, et al., "Personal Sensing: Understanding Mental Health Using Ubiquitous Sensors and Machine Learning," Annual Review of Clinical Psychology. 13(1):23-47 (2017).

Szegedy C, et al., "Inception-v4, Inception-ResNet and the Impact of Residual Connections on Learning," Proceedings of the Thirty-first AAAI Conj on Artificial Intelligence, 4278-4284 (2017).

* cited by examiner

SYSTEMS AND METHODS FOR PREDICTING REAL-TIME BEHAVIORAL RISKS USING EVERYDAY IMAGES

CROSS-REFERENCE TO RELATED APPLICATIONS

This application claims priority to U.S. Provisional Patent Application No. 62/746,077, filed Oct. 16, 2018 and U.S. Provisional Patent Application No. 62/867,952, filed Jun. 28, 2019, the disclosure of each of which is hereby incorporated by reference in its entirety.

FEDERAL FUNDING LEGEND

This invention was made with Government support under Federal Grant nos. R01 DA038442, R21 DA033083, K23 DA 042898, R03 DA023646, and R01 DA023646 awarded by the National Institute of Drug Abuse (NIH/NIDA). The Federal Government has certain rights to this invention.

BACKGROUND

Description of Related Art

It is widely known in healthcare fields that behaviors and lifestyle choices greatly impact individual health conditions. Numerous health risk behaviors such as smoking, lack of exercise, poor nutrition, tobacco use, excessive alcohol consumption, lack of sleep, etc. lead to higher incidences of illness and premature death. These risk behaviors also contribute greatly to obesity, type two diabetes, heart disease, stroke, cancer, and other ailments.

In the case of smoking, studies have found that for any given number of smokers who quit in any given year, the majority of quit attempts result in relapse. One reason most interventions may fail is that they teach smokers strategies for coping with craving in response to triggers (e.g. stress, the presence of other smokers), but do not provide smokers with just-in-time information about their risk of smoking lapse. Such risk information could be used to alert smokers to engage in relevant coping strategies including avoidance or use of quick acting pharmacotherapies (e.g. nicotine inhaler). Additionally, existing intervention systems may lack environmental context in order to deliver situationally relevant interventions.

Recently developed just-in-time adaptive interventions (JITAIs) require an accurate, dynamic and continuous assessment of the risk of a target behavior (e.g. smoking lapse) in order to prompt interventions, as well as the nature of the risk to provide situationally relevant interventions. However, to date, these strategies for dynamically predicting smoking lapses have largely relied on self-report which is burdensome and can only be assessed at relatively low frequency.

The present disclosure addresses these shortcomings by providing systems and methods for determining the risk, in real-time, of an individual to perform a targeted behavior and/or suffer a physiological event.

BRIEF SUMMARY OF THE DISCLOSURE

The Summary is provided to introduce a selection of concepts that are further described below in the Detailed Description. This Summary is not intended to identify key or essential features of the claimed subject matter, nor is it intended to be used as an aid in limiting the scope of the claimed subject matter.

The inventors have found that objects and settings found in daily environments can be used to consistently predict the risk of an individual performing a targeted behavior (e.g., smoking) and/or suffer a physiological event (e.g., an asthma attack).

An embodiment provides a system comprising a camera configured to generate image data and a computing device in electronic communication with the camera. The computing device comprises at least one processor. The computing device is configured to receive, from the camera, one or more images representative of a location. The computing device is further configured to apply a trained classifier to the one or more images to classify the location into one of at least two risk categories, wherein the classification is based on a likelihood of a subject performing a target behavior based on presence of the subject in the location. The computing device is additionally configured to issue a risk alert responsive to the trained classifier classifying the location into a high-risk category.

Another embodiment provides a method comprising receiving, from a camera, one or more images representative of a location. The method further comprises applying a trained classifier to the one or more images to classify the location into one of at least two risk categories, wherein the classification is based on a likelihood of a subject performing a target behavior based on presence of the subject in the location. The method additionally comprises issuing a risk alert responsive to the trained classifier classifying the location into a high-risk category.

An additional embodiment provides a mobile computing device comprising a camera configured to generate one or more images representative of a location of the mobile computing device. The mobile computing device further comprises a non-transitory computer-readable medium comprising program instructions executable by at least one processor to cause the at least one processor to apply a trained classifier to the one or more images to classify the location into one of at least two risk categories, wherein the classification is based on a likelihood of a subject performing a target behavior based on presence of the subject in the location; and issue a risk alert responsive to the trained classifier classifying the location into a high-risk category.

Additional features and advantages are described herein, and will be apparent from the following Detailed Description, Drawings, and the claims.

BRIEF DESCRIPTION OF THE DRAWINGS

The foregoing aspects and other features of the disclosure are explained in the following description, taken in connection with the accompanying drawings, wherein:

FIG. 6A is a graph showing the cross-validation results from the Durham cohort and subsequent test performance on the Pittsburgh cohort. FIG. 6B is a graph showing the cross-validation results from the Pittsburgh cohort and subsequent test performance on the Durham cohort. FIG. 6C is a graph showing training using both cohorts. Gray shading indicates ±1 SD of the mean of results across all cross-validation folds. Area under the curve (AUC) is 0.840±0.024, with accuracy of 76.5%±1.6% at an 0.5 classification threshold. FIG. 6D is a graph showing classifier performance on a 732-image test set compared with 4 smoking cessation experts who were asked, "Would you warn a smoker that this is an environment in which they might smoke or be tempted to smoke?" AUC indicates area under the receiver operating characteristic curve; ROC, receiver operating characteristic curve.

FIG. 8A is a graph showing the location of all smoking and nonsmoking images within a 2-dimensional (2D) representation of the logit layer from Inception v4 generated using t-stochastic neighbor embedding (t-SNE), a dimensionality reduction technique for high-dimension data. FIG. 8B is a graph showing locations of images manually identified as store interiors, patios, and personal vehicles among the 732 that were manually classified have been highlighted in the panels at right to show their locations within these representations in accordance with one embodiment of the present disclosure.

DETAILED DESCRIPTION OF THE DISCLOSURE

Figure 1:
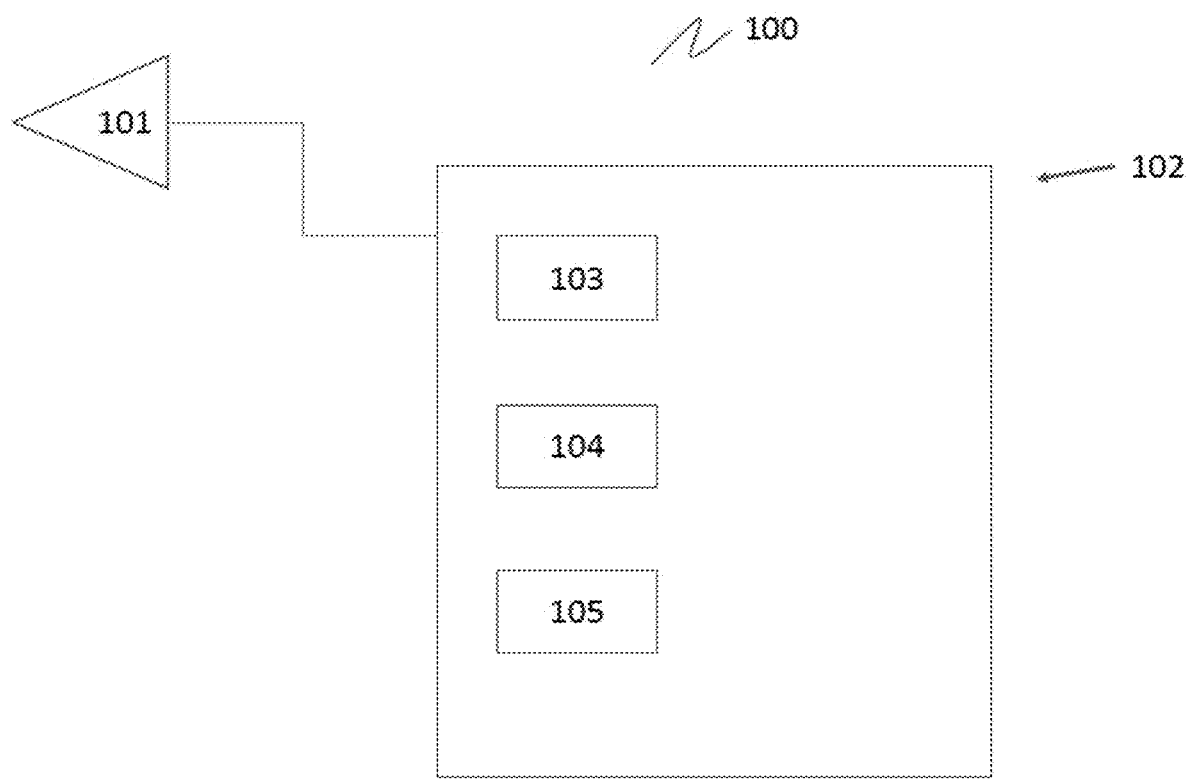
FIG. 1 is a diagram showing system components (camera and computing device) for predicting performance of a targeted behavior in accordance with one embodiment of the present disclosure.

For the purposes of promoting an understanding of the principles of the present disclosure, reference will now be made to embodiments and specific language will be used to describe the same. It will nevertheless be understood that no limitation of the scope of the disclosure is thereby intended, such alteration and further modifications of the disclosure as illustrated herein, being contemplated as would normally occur to one skilled in the art to which the disclosure relates.

Articles "a" and "an" are used herein to refer to one or to more than one (i.e., at least one) of the grammatical object of the article. By way of example, "an element" means at least one element and can include more than one element.

As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

As used herein, "about" is used to provide flexibility to a numerical range endpoint by providing that a given value may be "slightly above" or "slightly below" the endpoint without affecting the desired result.

The use herein of the terms "including," "comprising," or "having," and variations thereof, is meant to encompass the elements listed thereafter and equivalents thereof as well as additional elements. Embodiments recited as "including," "comprising," or "having" certain elements are also contemplated as "consisting essentially of" and "consisting of" those certain elements. As used herein, "and/or" refers to and encompasses any and all possible combinations of one or more of the associated listed items, as well as the lack of combinations where interpreted in the alternative ("or").

As used herein, the transitional phrase "consisting essentially of" (and grammatical variants) is to be interpreted as encompassing the recited materials or steps "and those that do not materially affect the basic and novel characteristic(s)" of the claimed invention. Thus, the term "consisting essentially of" as used herein should not be interpreted as equivalent to "comprising."

Moreover, the present disclosure also contemplates that in some embodiments, any feature or combination of features set forth herein can be excluded or omitted. To illustrate, if the specification states that a complex comprises components A, B, and C, it is specifically intended that any of A, B, or C, or a combination thereof, can be omitted and disclaimed singularly or in any combination.

"Optional" or "optionally" means that the subsequently described circumstance may or may not occur, so that the description includes instances where the circumstance occurs and instances where it does not.

Recitation of ranges of values herein are merely intended to serve as a shorthand method of referring individually to each separate value falling within the range, unless otherwise indicated herein, and each separate value is incorporated into the specification as if it were individually recited herein. For example, if a concentration range is stated as 1% to 50%, it is intended that values such as 2% to 40%, 10% to 30%, or 1% to 3%, etc., are expressly enumerated in this specification. These are only examples of what is specifically intended, and all possible combinations of numerical values between and including the lowest value and the highest value enumerated are to be considered to be expressly stated in this disclosure.

Unless otherwise defined, all terms (including technical and scientific terms) used herein have the same meaning as commonly understood by one having ordinary skill in the art to which this disclosure belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

It will be understood that a number of aspects and embodiments are disclosed. Each of these has an individual benefit and each can also be used in conjunction with one or more, or in some cases all, of the other disclosed aspects and embodiments, whether specifically delineated or not. Accordingly, for the sake of clarity, this description will refrain from repeating every possible combination of the individual aspects and embodiments in an unnecessary fashion. Nevertheless, the specification and claims should be read with the understanding that such combinations are implicitly disclosed, and are entirely within the scope of the invention and the claims, unless otherwise specified.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of exemplary embodiments in whole or in part.

As used herein, the term "behavior" and "targeted behavior" refer to one or more behavior(s) that are associated with a disorder, condition, habit, addiction, other behavioral and/or psychiatric conditions, and the like, the performance of which is desired to be either reduced or eliminated (e.g., smoking/nicotine addiction, drinking alcohol, falling, etc.) or, in some cases, increased (e.g., more sleep, more exercise for physical activity). Suitable targeted behaviors may include, but are not limited to the following behaviors and/or behavioral symptoms associated with the following conditions: anxiety, eating disorders (e.g., anorexia, bulimia, etc.), falling, insomnia, smoking/nicotine addiction, ADHD (associated with, e.g., interrupting others and/or difficulty concentrating), obsessive compulsive disorder, sensory integration disorder, alcoholism, physical activity, eating behavior and combinations thereof. In certain embodiments, the target behavior comprises smoking/nicotine addiction. An additional class that may be targeted for intervention is subjective experience, which may be included under the umbrella of targeted behavior, or may be treated as a separate class. Subjective experience may include any perceptible subject emotions or feelings, such as but not limited to craving, anxiety, fear, anger, or trauma recall.

As used herein, the term "physiological event" refers to any event that may adversely affect the subject physiologically. Examples include, but are not limited to, allergic reactions (e.g., swelling, sneezing, watery eyes, skin irritations (e.g., rashes), anaphylactic shock, etc.), seizures, asthma attacks, high blood pressure, stroke, and the like.

As used herein, the term "subject," "individual," and "patient" are used interchangeably herein and refer to both human and nonhuman animals. The term "nonhuman animals" of the disclosure includes all vertebrates, e.g., mammals and non-mammals, such as nonhuman primates, sheep, dog, cat, horse, cow, chickens, amphibians, reptiles, fish and the like. In some embodiments, the subject is a human. In other embodiments, the subject is a human that is suffering from a disorder, condition, addiction, habit, etc. and displays or is deficit in one or more targeted behaviors or is at risk of suffering from a physiological event. In one embodiment, the subject suffers from an addiction. In certain embodiments, the addiction comprises smoking, As will be appreciated by one of skill in the art, the present disclosure may be embodied as a method, system, or computer program product. Accordingly, the present disclosure may take the form of an entirely hardware embodiment, an entirely software embodiment (including firmware, resident software, micro-code, app etc.) or an embodiment combining software and hardware aspects. Furthermore, the present disclosure may take the form of a computer program product on a computer-usable storage medium having computer-usable program code embodied in the medium.

Any suitable computer readable medium may be utilized. The computer-usable or computer-readable medium may be, for example but not limited to, an electronic, magnetic, optical, electromagnetic, infrared, or semiconductor system, apparatus, or device. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, radio frequency (RF), etc. Moreover, the computer readable medium may include a carrier wave or a carrier signal as may be transmitted by a computer server including internets, extranets, intranets, world wide web, ftp location or other service that may broadcast, unicast or otherwise communicate an embodiment of the present invention. The various embodiments of the present invention may be stored together or distributed, either spatially or temporally across one or more devices.

Computer program code for carrying out operations of the present invention may be written in an object-oriented programming language such as Java, Smalltalk, or C++. However, the computer program code for carrying out operations of the present disclosure may also be written in conventional procedural programming languages, such as the "C" programming language. The program code may execute entirely on the user's computing device (e.g., computer, smartphone, laptop, tablet, etc.), partly on the user's computing device, as a stand-alone software package, partly on the user's computing device and partly on a remote computing device or entirely on the remote computing device. In the latter scenario, the remote computing device may be connected to the user's computing device through a local area network (LAN) or a wide area network (WAN), or the connection may be made to an external computer (for example, through the Internet using an Internet Service Provider).

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem, and Ethernet cards are just a few of the currently available types of network adapters.

As used herein, the term "electric communication," "electronic communication," and "electrical communication" refers to any means in which two electronic devices may be attached and communicate (e.g., share/transfer data). Such communication may be wired or wireless. Examples of wireless communication include Wi-Fi, Bluetooth, infrared, GSM, RF, GPS, RFID, and the like.

System

FIG. 1 illustrates a diagram of a system for predicting, in real-time, a risk of a user performing a target behavior and/or suffering from a physiological event.

As depicted in FIG. 1, the system 100 includes a camera 101 configured to generate image data. Such image data may include images and/or video relating to (a) everyday locations associated with the target behavior and/or physiological condition and (b) everyday locations not associated with the target behavior and/or physiological condition. In some examples, the camera 101 may produce a stable video output of 250 lines of resolution or greater and, optionally, have a camera flash, infrared illumination or quasi night vision for operating in extremely low light conditions. Additionally, the camera 101 may have a relatively fast shutter speed to capture relatively fast movements without blurring at frame rates of 20 fps or above.

Referring again to FIG. 1, the camera 101 is in electronic communication with a computing device 102. In some embodiments, the camera 101 may be integrated with the computing device (e.g., a camera found in a smartphone/tablet, smart watch, etc.) or operate as a standalone imaging device, such as a Google Clip®, Go Pro® and the like. The computing device 102 comprises a processor 103, memory 104 and optional video processor 105. In one embodiment, the memory 104 includes both ROM and RAM type as necessary for storing and executing program instructions and a high capacity memory, such as a hard drive, for storing large sequences of video/photographic image frames.

Additionally, the computing device 102 may be fitted with a high capacity flash memory for temporarily storing temporal image frames during image processing and/or prior to more permanent storage on a hard drive or at a network location. Optional video processor 105 may be a dedicated image processor under the control of an application routine executing on processor 103, or may be logic operating in processor 103.

The memory 104 may store one or more program instructions executable by a processor 103 and/or computing device 102 for implementing specific logical functions or steps in any of the processes or methods described herein. The program instructions can be stored on any type of computer-readable medium, for example, such as a storage device including a disk or hard drive. The computer-readable medium can include non-transitory computer-readable medium, for example, such as computer-readable media that stores data for short periods of time like register memory, processor cache and RAM. The computer-readable medium can also include non-transitory media, such as secondary or persistent long term storage, like ROM, optical or magnetic disks, or CD-ROM, for example. The computer-readable medium can also be any other volatile or non-volatile storage systems. The computer-readable medium can be considered a computer-readable storage medium, for example, or a tangible storage device.

Figure 2:
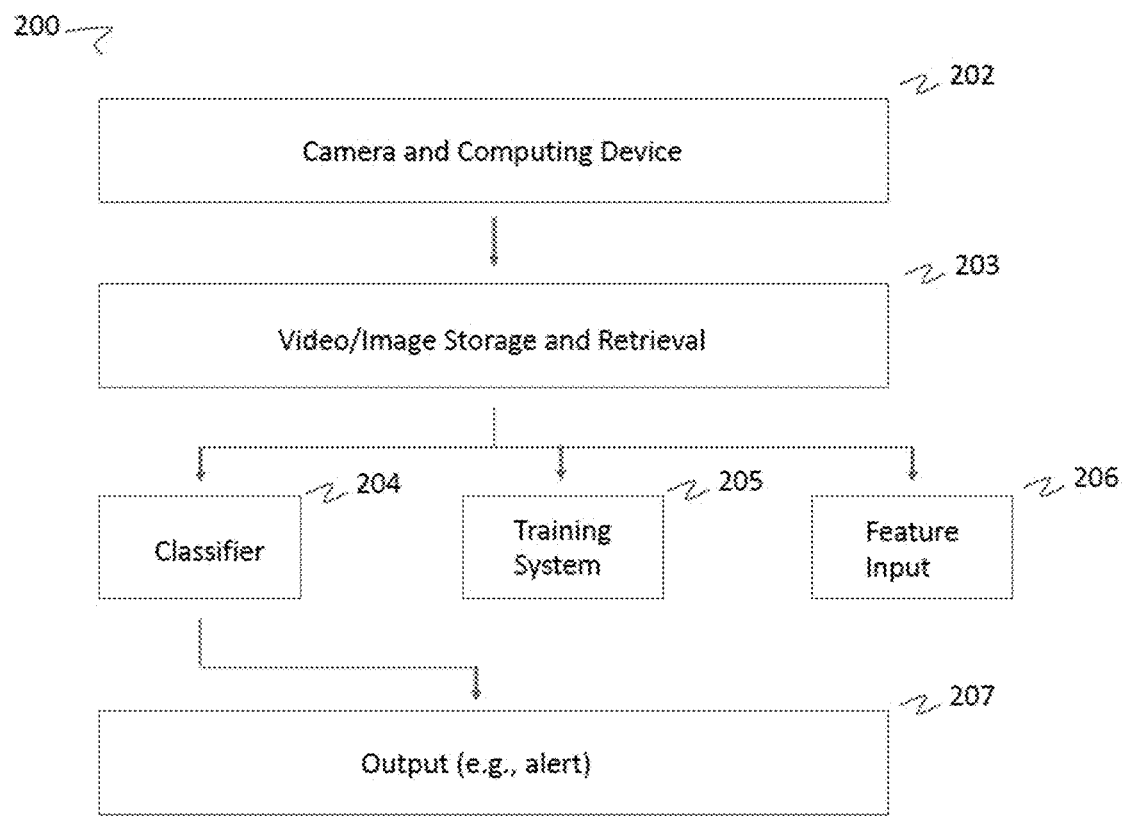
FIG. 2 is a flow chart outlining the system for predicting performance of a targeted behavior in accordance with one embodiment of the present disclosure.

FIG. 2 illustrates how the system processes and analyzes the received images in accordance with one embodiment of the present disclosure.

As the embodiment of FIG. 2 illustrates, a video/image storage and retrieval device 203 is utilized for receiving video/image frame data from the camera and/or computing device 202 and storing said data. In one embodiment, video/image frame data may be stored permanently, or, alternatively, may be stored temporarily solely for processing. Video/image frame data may be stored in a number of formats and on a number of mechanisms such as flat file storage, relational database storage, or the like.

Classifier 204, training system 205, and feature definition storage 206 are interconnected to train and operate the classifier 204, as discussed in more detail below. In one embodiment, the classifier utilizes a combination of deep convolutional neural network (CNN) with an interpretable linear classifier. In certain embodiments, the CNN comprises inception V4. In other embodiments, the classifier 204 and training system 205 may comprise a dedicated server, or multiple servers, utilizing multiple processors and designed to receive and process image data using techniques described herein. Likewise, feature definition storage 206 may comprise a dedicated memory unit or units (e.g., RAM, hard disk, SAN, NAS, etc.).

Feature definition storage 206 may store a predefined number of features and an associated process for extracting such features from the data stored within the video/image storage and retrieval device 203. As used herein, the term "features" refers to anything that may be associated with the targeted behavior and/or physiological event. For example, a feature may comprise a physical location that is associated, or not associated, with the targeted behavior and/or physiological event. A feature may also comprise one or more objects, environmental conditions (e.g., loud/soft sounds, bright or dim light, wind, hot, cold, day, night, etc.) and/or user status (e.g., level of physical activity, GPS location). The object, environmental condition, and/or user status may be, by itself, associated, or not associated, with the target behavior and/or physiological event (e.g., an ashtray, a trash receptacle, GPS location, etc.), found in a location. Alternatively, the object, environmental condition, and/or user status may be associated with the particular location (e.g., a shelter, a sign, a bus stop, loud sound, etc.) and be associated with, or not associated with, the target behavior and/or physiological event. The particular locations, objects, environmental conditions, and/or user status may be personal to the user, and classified according the methods provided herein. In further examples, the features may not be directly interpretable (e.g., features chosen by an off-the-shelf neural network). In such examples, features which are not directly interpretable may correspond to intermediate layers (e.g., hidden layers) of a neural network. The neural network may be trained to directly provide output indicating risk levels and/or recommended behaviors for input images without any nodes tied to interpretable environmental features. The training system 205 loads features from the feature definition storage 206 and extracts and stores features from the video/image received from video/image storage and retrieval device 203. Using techniques discussed more fully herein, the training system 205 processes a plurality of frames and generates a classifier 204. The classifier 204 may be stored for subsequent usage and processing of additional video frames.

In operation, the classifier 204 receives video/image data from the video/image storage and retrieval device 203. The classifier 204 analyzes incoming video/image frames and extracts features from the video/image frames. Using these extracted features, the classifier 204 then applies the current predictive model to classify images into one of at least two risk categories. The classification may be based on a likelihood of a subject performing a target behavior, or having a subjective experience, or experiencing a physiological event, based on presence of the subject in the location. The risk categories may include at least a high-risk category and a low-risk category. A location categorized as high-risk may be associated with a greater likelihood that a subject will perform a target behavior than a location categorized as low-risk. For instance, a high-risk category may correspond to a smoking environment and a low-risk category may correspond to a nonsmoking environment as otherwise described herein. In further examples, one or more risk categories may be associated with features that promote positive outcomes as well or instead (e.g., to alert a user to healthy foods or healthy places such as nature areas).

In some examples, classifying an image may involve determining a risk index. The risk index may be a numerical representation of a predicted likelihood that the subject will perform the target behavior. The risk index may be compared to a threshold risk (e.g., 10% or 30% or 50%) to determine whether to identify a location as high-risk (e.g., having a risk index greater than the risk threshold) or low-risk (e.g., having a risk index less than the risk threshold).

After classifying a given frame, the classifier 204 may then transmit the results of the classification to the camera/computing device 202 to issue a risk alert when a location is classified into a high-risk category. Risk alerts may comprise any alert that can be sent to the user. Examples include, but are not limited to, audible alerts, tactile alerts, visual alerts, neural alerts, social alerts (e.g., children are notified when an elderly parent triggers a targeted behavior or suffers a physiological event, such as falling), and the like. In some embodiments, the risk alert comprises at least one or more of (i) an audible alert; (ii) a visual alert; or (iii) a tactile alert; and/or (iv) electronically communicating one or more behavioral recommendations to reduce the risk of performing the behavior to the user.

In further examples, a location may be classified into one of more than two different possible risk categories (e.g., low-risk, medium-risk, or high-risk). In additional examples, a single classifier may be trained to classify locations into one or more risk categories from a group of possible risk categories corresponding to multiple different target behaviors and/or physiological conditions. In yet further examples, a classifier may be trained to distinguish between locations associated with a high likelihood of a subject performing a target behavior while in the location and locations with a high likelihood of a subject performing a target behavior after leaving the location. Additionally, a risk alert issued by a computing device may be adjusted based on the output of a classifier. For instance, different levels of risk alerts may be issued for different likelihoods of a target behavior being performed and/or different types of risk alerts may be issued for different target behaviors or physiological conditions.

In further examples, risk alerts and/or other feedback may be provided to a user by way of a display interface (e.g., a display screen of a smartphone). In some examples, the display interface may be configured to display an image of the location with at least one identified object highlighted to indicate an association between the at least one identified object and the target behavior. In additional examples, the location of features associated with positive outcomes may be highlighted as well or instead (e.g., highlighting junk food in red and healthy snacks in green). In further examples, the display interface may be configured to display a visual indicator representative of a risk alert. Example indicators may include a graphical representation indicating different risk levels, such as a thermometer or dial, a number chosen from a set of numbers, or a color chosen from a set of colors (e.g., red, green, or yellow).

In yet further examples, the display interface may be configured to display behavioral recommendations to a user based on risk associated with the current location of the user. Notably, information generated by a trained classifier may be used to inform and customize the selection of recommended behaviors. For instance, three or four different possible interventions may be displayed to a user and ranked based on their expected effectiveness for a particular scenario. These recommendations may be determined by a model trained initially based on survey data from experts indicating in their clinical judgement which intervention is most appropriate for a given scenario. By using environmental context to influence intervention recommendations, a trained model may provide advantages over other monitoring systems. By way of example, a system based on inputs from physiological sensors may be able to identify stress based on blood pressure or heart rate, but cannot make a behavioral recommendation based on the type of stress (e.g. social stress, work-related, being stuck in traffic, etc.).

Additionally, the classifier 204 may provide a feedback loop to the training system 205. Using this loop, the classifier 204 may continuously update the training data set used by training system 205. In alternative embodiments, the classifier 204 may only update the training data set in response to a confirmation that an alarm condition was properly raised. For example, the system may be configured to allow the user to confirm or refute that an actual alarm condition has been properly raised. In further examples, sensor data from one or more sensors (e.g., visual or auditory sensors) of a mobile device may be used to determine whether or not a user performed a target behavior and/or had a physiological condition. In this manner, the classifier 204 updates the predicted alarm condition based on the actual events and supplements the training system 205 with the corrected data. In other embodiments, the system may be configured to allow further feedback loops from the user, for example, to comment on whether or not the recommended intervention was performed by the user and/or effective when performed. Whether recommended behaviors were performed and/or the effectiveness of recommended behaviors may also be determined autonomously based on sensor data as well or instead. In such embodiments, the classifier 204 updates and supplements the training system 205 not only with what objects, environmental conditions, and/or user statuses are associated with which risk behavior/physiological condition, but also which features are associated with an efficacious intervention.

In further examples, the system could also send random prompts to users requesting that users provide information about their environments (e.g., is there an ashtray in this room?) or about their current states (e.g., what is your current level of anxiety?). Information contained in the user responses could be used to further train and update the classifier. Similarly, the system could take inputs from other sensors (e.g., a heart rate sensor or an accelerometer) and use these inputs to trigger the acquiring of images. These images could then be used to learn what environment features are associated with various physiology and behaviors. A wrist-worn sensor could, for instance, detect smoking behavior, which may then trigger a camera to take a picture of the environment. Images labeled this way could be used to further train the classifier. In yet further examples, the system may learn what specific locations are associated with various behaviors, physiology, and/or experiences. These learned locations may be used to create map layers based on the associated information. For instance, a system could generate a smoking risk topography. Such topographies can include information from known instances of smoking, or topographies can be inferred from their features (e.g., by applying a trained model to street view image data of an environment). When a model achieves sufficient accuracy for an area, only location data (e.g., GPS data) may be needed to provide alerts and interventions rather than image data.

In yet another example, the system may make predictions about risks from geotagged images that are acquired from publically available databases (e.g. Google street map images). A model can make predictions about various risks from such images and assign a risk level to the geographic location. These learned associations may also be used to create risk topographies as described above.

Figure 3:
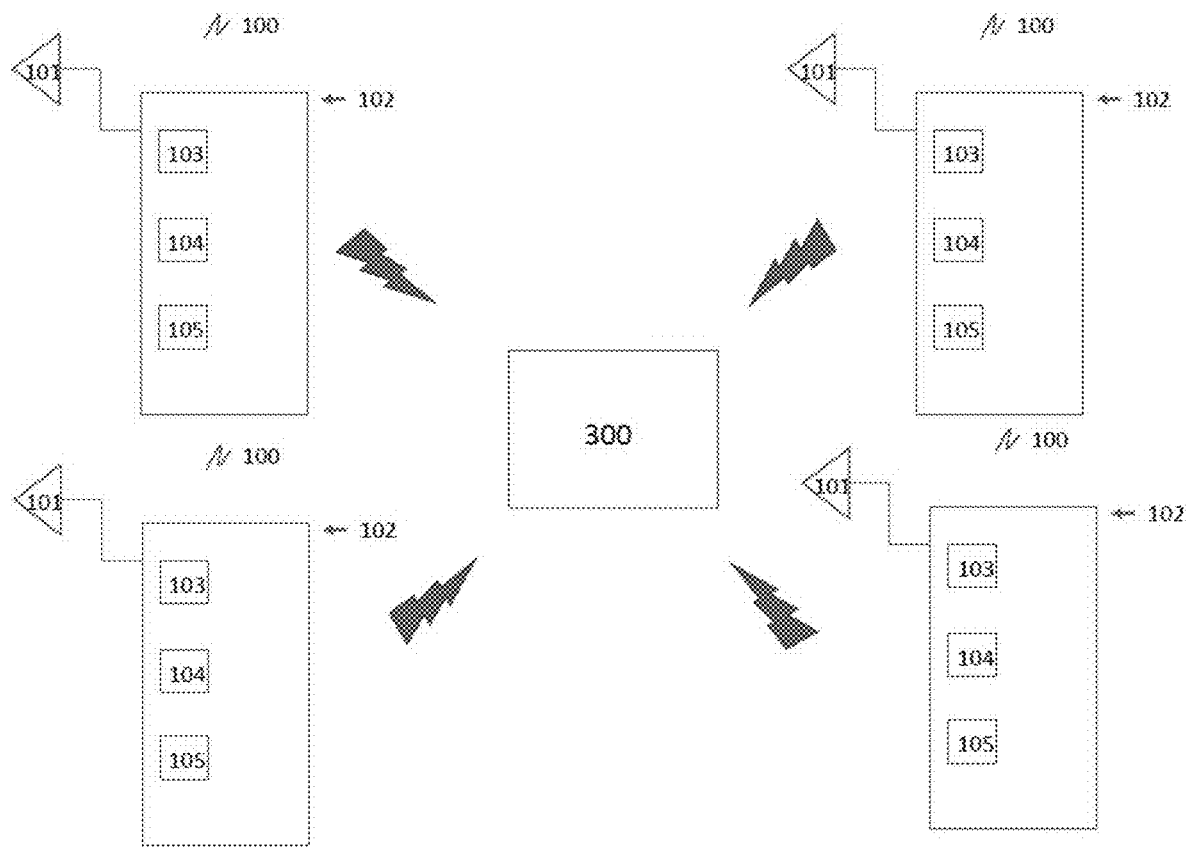
FIG. 3 is a diagram showing the system for predicting performance of a targeted behavior in a network in accordance with one embodiment of the present disclosure.

The system 100 may be set up in a number of ways. For example, in one embodiment, the classifier 204, training system 205, and feature definition storage 206 may be housed within the computing device 102, whereby video/images taken by the camera are processed as described above within the same device. Alternatively, and as shown in FIG. 3, the classifier 204, training system 205, and feature definition storage 206 may be housed in a central network 300, whereby multiple computing devices 102 are linked together such that videos/images taken by each device is processed by the central network 300 and shared amongst the computing devices.

In yet other embodiments, the system 100 utilizes multiple classifiers, training systems, and feature definition storage units in order to increase throughput and/or accuracy of the system 100.

Furthermore, the processing by the classifier may be distributed among a plurality of servers in an arrangement known as "cloud computing.". This configuration may provide several advantages, such as, for example, enabling near real-time uploads and downloads of information as well as periodic uploads and downloads of information.

Methods

Figure 4:
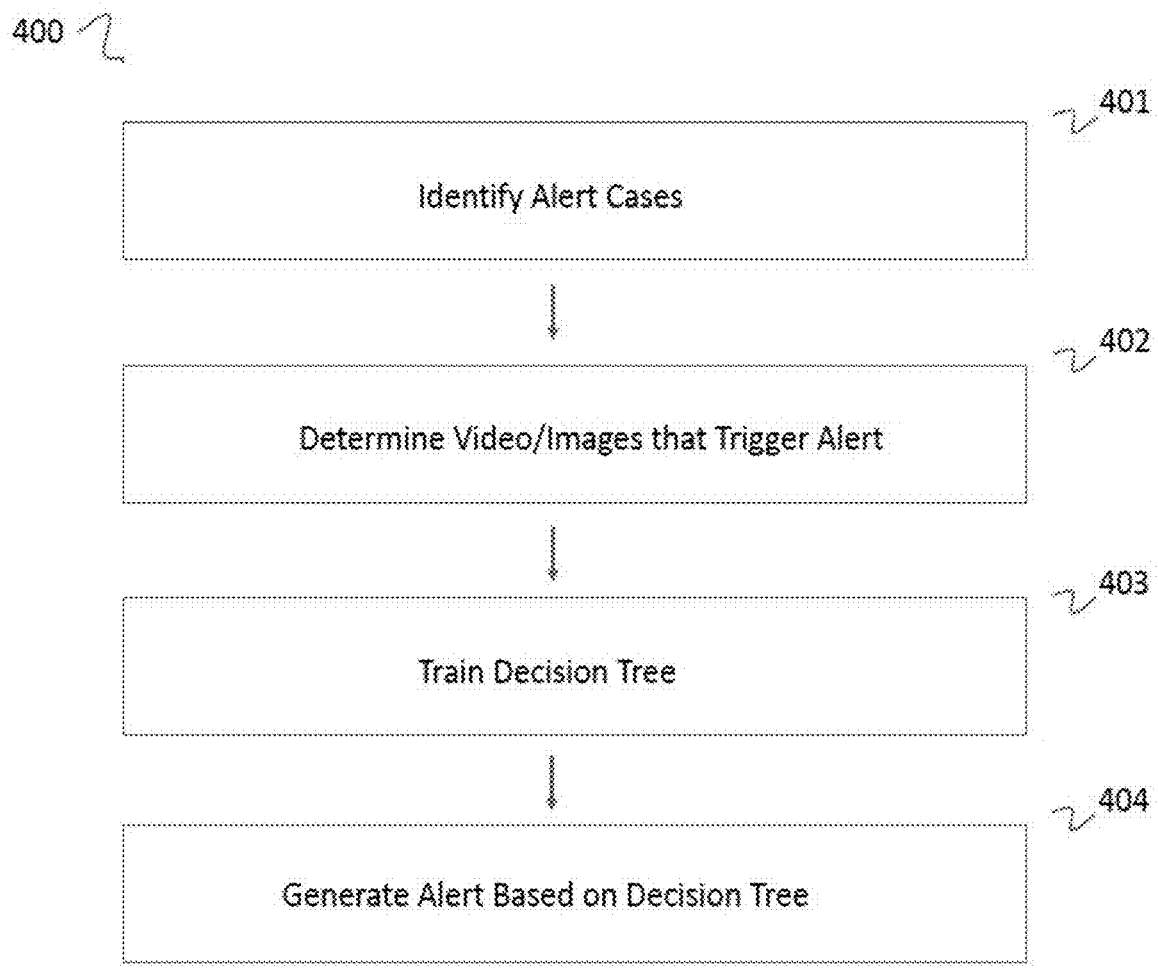
FIG. 4 is a flow chart outlining a method for predicting performance of a targeted behavior in accordance with one embodiment of the present disclosure.

FIG. 4 presents a flowchart of a method for predicting in real-time a risk of a user performing a target behavior and/or suffer from a physiological event in accordance with one embodiment of the present disclosure.

A computing device may receive video/images including a plurality of video/image frames and a log of events or alerts associated with a targeted behavior. Alert cases are identified from the video/image, step 401. Each video/image can be examined and labeled as alert or no-alert cases. Alert and no-alert cases may correspond to high-risk and low-risk categories, respectively. In one embodiment, the identification of alert cases may be based upon historical data associated with the video/image. Alternatively or in addition to, the method 400 may utilize video/images collected from a plurality of computing devices as described supra.

After identifying a video/image that has triggered an alert, the specific frames that trigger the alert case are determined, step 402, and video/image frames that include alert cases or events related to performing the targeted behavior may be collected. In one embodiment, the number of videos/images that correspond to an alert case may be greater than the number of videos/images that actually correspond to a potential target behavior, given the potential for false positives as discussed above. Furthermore, a given video/image may have potentially triggered multiple alerts during the course of the video/image. In one embodiment, false positives may be further limited by requiring alerts for a predetermined threshold number of images (e.g., two, three, four, or more consecutive alerts) before signaling an alert. Thus, step 402 operates to identify, as narrowly as possible, the specific video/image frames corresponding to a given alert. In one embodiment, the threshold number of frames needed to identify the instance an alert is triggered is three, although the number of frames required may be increased or decreased. By utilizing multiple prior frames, the method 400 may compensate for changes in lighting or other factors that contribute to a noise level for a given set of frames.

For each alert case, the number and sequence of frames that could trigger an alert for performance of the targeted behavior are identified. In an alternative embodiment, video/image and frames may be manually tagged and received from users or an operator of a video/image collecting system. Additionally, the method 400 may also tag those video/image frames that do not trigger an alert, to further refine the supervised learning approach. By identifying frames that do not trigger an alarm, the method 400 may increase the reliability of the system versus solely tagging those frames that do cause an alarm.

After identifying each of these features, a training data set may be constructed with each of the features being associated with a set of frames and a label indicating that an alert was, or was not triggered. A classifier, such as a decision tree or similar learning machine (such as nearest neighbor, support vector machines, or neural networks), is trained based on the features, step 403. In one embodiment, the method 400 may input the training data set into a decision tree classifier to construct a decision tree utilizing the identified features.

A classifier may be chosen for training based on a training set of the features determined from the video/images and the identification of alert cases for certain video/image frames. Any classifier may be selected based on its ease of training, implementation, and interpretability. In some embodiments, the classifier utilizes a combination of deep convolutional neural network (CNN) with an interpretable linear classifier. The CNN may be trained to identify one or more objects in an image. The interpretable linear classifier may be trained to generate a risk index based on the one or more objects identified by the CNN (e.g., by effectively weighting particular objects and/or or combinations of objects). A location may then be classified into a risk category based on the risk index. In further examples, other types of input data may be used with a trained classifier, including, for example, sound, accelerometer data, and/or GPS location data. Such input data may be used in addition to or instead of image data. Any neural network may be utilized with the present disclosure.

As is recognized by those skilled in the art, neural networks work best when they have many parameters, making them powerful function approximators. However, this means that they must be trained on very large datasets. Because training models from scratch can be a very computationally intensive process, it is within the scope of the present disclosure that pre-trained models may also be utilized. Examples of suitable pretrained CNNs include, but are not limited to, the CNNs listed in Table 1:

TABLE 1

Pretrained CNNs

| Model | TF-Slim File | Checkpoint | Top-1 Accuracy | Top-5 Accuracy |
|---|---|---|---|---|
| Inception V1 | Code | inception_v1_2016_08_28.tar.gz | 69.8 | 89.6 |
| Inception V2 | Code | inception_v2_2016_08_28.tar.gz | 73.9 | 91.8 |
| Inception V3 | Code | inception_v3_2016_08_28.tar.gz | 78.0 | 93.9 |
| Inception V4 | Code | inception_v4_2016_09_09.tar.gz | 80.2 | 95.2 |
| Inception-ResNet-v2 | Code | inception_resnet_v2_2016_08_30.tar.gz | 80.4 | 95.3 |
| ResNet V1 50 | Code | resnet_v1_50_2016_08_28.tar.gz | 75.2 | 92.2 |
| ResNet V1 101 | Code | resnet_v1_101_2016_08_28.tar.gz | 76.4 | 92.9 |
| ResNet V1 152 | Code | resnet_v1_152_2016_08_28.tar.gz | 76.8 | 93.2 |
| ResNet V2 50^ | Code | resnet_v2_50_2017_04_14.tar.gz | 75.6 | 92.8 |
| ResNet V2 101^ | Code | resnet_v2_101_2017_04_14.tar.gz | 77.0 | 93.7 |
| ResNet V2 152^ | Code | resnet_v2_152_2017_04_14.tar.gz | 77.8 | 94.1 |
| ResNet V2 200 | Code | TBA | 79.9* | 95.2* |
| VGG 16 | Code | vgg_16_2016_08_28.tar.gz | 71.5 | 89.8 |
| VGG 19 | Code | vgg_19_2016_08_28.tar.gz | 71.1 | 89.8 |
| MobileNet_v1_1.0_224 | Code | mobilenet_v1_1.0_224.tgz | 70.9 | 89.9 |
| MobileNet_v1_0.50_160 | Code | mobilenet_v1_0.50_160.tgz | 59.1 | 81.9 |
| MobileNet_v1_0.25_128 | Code | mobilenet_v1_0.25_128.tgz | 41.5 | 66.3 |
| MobileNet_v2_1.4_224^* | Code | mobilenet_v2_1.4_224.tgz | 74.9 | 92.5 |
| MobileNet_v2_1.0_224^* | Code | mobilenet_v2_1.0_224.tgz | 71.9 | 91.0 |
| NASNet-A_Mobile_224# | Code | nasnet-a_mobile_04_10_2017.tar.gz | 74.0 | 91.6 |
| NASNet-A_Large_331# | Code | nasnet-a_large_04_10_2017.tar.gz | 82.7 | 96.2 |
| PNASNet-5_Large_331 | Code | pnasnet-5_large_2017_12_13.tar.gz | 82.9 | 96.2 |
| PNASNet-5_Mobile_224 | Code | pnasnet-5_mobile_2017_12_13.tar.gz | 74.2 | 91.9 |

^ResNet V2 models use Inception pre-processing and input image size of 299 (use --preprocessing_name inception --eval_image_size 299 when using eval_image_classifier.py). Performance numbers for ResNet V2 models are reported on the ImageNet validation set.
More information and details about the NASNet architectures are available at (github.com/tensorflow/models/blob/master/research/slim/nets/nasnet/README.md)
All 16 float MobileNet V1 models reported in the MobileNet Paper (arxiv.org/abs/1704.04861) and all 16 quantized TensorFlow Lite (www.tensorflow.org/lite) compatible MobileNet V1 models can be found here (github.com/tensorflow/models/blob/master/research/slim/nets/mobilenet_v1.md).
^#More details on MobileNetV2 models can be found here (github.com/tensorflow/models/blob/master/research/slim/nets/mobilenet/README.md).
*Results quoted from the paper (arxiv.org/abs/1603.05027).

In one embodiment, the deep convolutional neural network comprises a high-performance implementation comprising Inception or ResNet architecture+interpretable linear classifier. In certain embodiments, the Inception comprises inception V4. In another embodiment, the deep convolutional neural network comprises a mobile implementation comprising MobileNet architecture+interpretable linear classifier. In certain embodiments, the MobileNet architecture comprises MobileNet v2.

In another embodiment, the method 400 may utilize cross-validation to construct a decision tree. Although the method 400 discusses a single classifier, alternative embodiments exist wherein a collection of classifiers (e.g., decision trees) may be utilized to provide higher accuracy than a single classifier. For example, the method 400 may employ boosted decision trees or a random forest to maximize accuracy.

After the classifier is trained, it may be utilized in a production setting. In one embodiment, the classifier may be employed in the real-time prediction system discussed above. That is, the classifier may be used in place of existing techniques for analyzing image frames. In an exemplary embodiment, the behavior/event prediction system may feed video/image frames into the classifier on a real-time or near real-time basis. The method 400 may generate an alert based on the output of the classifier, step 404. The classifier may include various nodes for facilitating a behavior detection system to determine whether a given unclassified frame of video/image should trigger an alert associated with a behavior performance event. In some embodiments, the risk alert comprises at least one or more of (i) an audible alert; (ii) a visual alert; or (iii) a tactile alert; and/or (iv) electronically communicating one or more recommendations to reduce the risk of performing the behavior to the user. Recommendations to reduce the risk of performing the behavior and/or suffer a physiological event can include one or more of the following: (i) utilize a behavioral coping strategy (e.g., take deep breaths to reduce stress); (ii) engage in an alternate behavior (e.g., chew on a straw/gum etc. instead of smoking/chewing tobacco); (iii) reconfigure the environment to reduce risk (e.g., add features such as hand rails or grab bars to reduce fall hazard, remove TV from bedroom to improve sleep, remove ashtray from room, etc.); (iv) leave the location; (v) utilize a therapy aid (e.g., a nicotine patch); (vi) contact a support individual; and combinations thereof. Such recommendations are dependent on the behavior being targeted and also the context in which the behavior/event is at risk of occurring. For instance, strong craving might take in a place where use of NRT cannot be used readily. In such cases, the system would recommend a different option (e.g., deep breaths or other coping) and can be readily determined by one skilled in the art.

Features of daily environments can predict their high-risk or low-risk status in regards to triggering smoking behavior consistently across participants. In some embodiments, a computer vision approach can identify environments associated with smoking, predict the probability that any image of daily life represents a smoking environment, and potentially trigger environment-based interventions. The results described herein demonstrate a framework for predicting how daily environments influence target behaviors or symptoms with broad applications in mental and physical health.

In an example embodiment, a trained classifier performed better than chance and similar to smoking cessation experts; it generalized across participants living in two geographic areas (e.g., Durham, N.C. and Pittsburgh, Pa.); and its predictions correlated with environment-associated craving reported by smokers. The models described herein could be used to trigger a JITAI, estimate smoking patterns and craving associated with any image of daily life during a quit attempt, or retrospectively explore environmental factors that can contribute to a relapse. For instance, it may be learned that a total load of exposure to environments over the course of days or weeks may effectively predict relapse. In other words, it may not be the case that a single environment is predictive of a particular behavior or experience, but rather some collection of environments (e.g., the total number of smoking risk environments in one's daily travels), or a particular sequence of locations, or the total number of exposures over time. A trained model may then be refined to better accommodate such associations to provide more effective interventions.

Yet another aspect of the present disclosure provides all that is disclosed and illustrated herein.

The following Examples are provided by way of illustration and not by way of limitation.

Example 1: Identifying Smoking-Risk Environments from Everyday Images with Deep Learning Environments associated with smoking increase craving to smoke and may provoke lapses during a quit attempt. Identifying smoking-risk environments from images of a smoker's daily life provides a basis for environment-based interventions. To apply deep learning to the clinically relevant identification of smoking environments among the settings smokers encounter in daily life, images of smoking (N=2457) and nonsmoking (N=2445) locations were photographed by 169 smokers from the Durham, N.C. and Pittsburgh, Pa. areas. These images were used to develop a probabilistic classifier that predicts the location type (smoking/nonsmoking), thus relating objects/settings in daily environments to established smoking patterns. The classifier combines a deep convolutional neural network with an interpretable logistic regression model, and was trained and evaluated via nested cross-validation with participant-wise partitions (i.e., out-of-sample prediction). To contextualize model performance, images taken by 25 randomly-selected participants were also classified by four smoking cessation experts. As secondary validation, craving levels reported by participants when viewing unfamiliar environments were compared to the model's predictions.

In this cross-sectional study, a deep learning classifier was trained to identify environments associated with smoking. Results generalize across participants and geographic locations and point to specific objects/settings associated with smoking. Model predictions were significantly correlated with participant-reported craving when viewing unfamiliar environments.

Cigarette smoking results in the death of 500,000 Americans a year, yet our best smoking cessation interventions, which only a small percentage of smokers take advantage of, achieve <20% long-term (6-month) abstinence rates. Previous research has shown that smokers' daily environments work against them during a quit attempt: personal smoking environments provoke craving and increase smoking behaviors even in the absence of cigarettes, lighters, and other proximal smoking cues. Indeed, viewing personal smoking environments has been linked to greater activation of a brain region associated with craving (i.e. the insular cortex) compared to personal nonsmoking environments, and the degree of this effect is associated with subsequent smoking behaviors. Thus, continued exposure to specific daily environments appears to confer risk for lapse and relapse, suggesting that systematically identifying these environments and studying their characteristics might open the door to novel, environment-based cessation strategies.

Mobile devices and lightweight cameras now allow images and other information about daily environments to be collected on an ongoing basis. These technologies are convenient, inexpensive, and accessible to a majority of smokers. Previous research using wearable cameras (e.g. Microsoft SenseCam, GoPro, Google Clip) has shown that a stream of everyday images can help to identify lifestyle characteristics, categorize physical activity, and detect fall risks. Additionally, mobile devices can process the information they collect in real-time and interact with a user through prompts or alerts. Building on this paradigm, mobile devices make it possible to adapt an intervention to the situation at hand on an individual basis. This has been formalized as the just-in-time adaptive intervention (JITAI), which has been successfully applied to smoking cessation. The JITAI framework requires dynamic, ongoing assessment of the probability that a target behavior will occur in order to trigger an intervention at the most opportune moment(s) However, most JITAIs have based this assessment on the internal state of the patient—for example by utilizing physiologic measurements or self-report to estimate smoking risk, or to support dieting—without also considering the influence of the external environment.

Due to recent advances in deep learning, images of daily environments can now be systematically analyzed and incorporated in the JITAI framework. A type of deep learning model called the convolutional neural network (CNN) can be applied to identify objects and settings present in the image or make other image-related predictions. Typically, CNNs are initially trained with everyday images, but they have been successfully repurposed for clinical applications including identifying diabetic retinopathy and skin cancer. Moreover, computationally-efficient CNNs (i.e. with fewer parameters) have now been developed for mobile devices, allowing images to be rapidly analyzed with a smartphone or other device without substantially compromising performance. With a CNN-equipped smartphone or wearable, images of daily life can be interpreted and processed in real-time to predict the user's risk of engaging in target behaviors, including smoking.

As part of a longstanding program of research on environments and smoking, 169 smokers were asked to photograph daily environments where they smoke, but without capturing any proximal smoking cues (e.g. cigarettes, lighters); and daily environments where they do not smoke. The resulting images (N=4,902) were used to train a deep learning classifier to predict the probability that a given image of daily life represents a smoking environment versus a nonsmoking environment. This value can then be used to determine whether new environments are likely to promote smoking behaviors, which can be an effective proxy for smoking risk.

More broadly, the study can establish and demonstrate a framework for interpreting and predicting the influence of daily environments on target behaviors or symptoms. This approach could be similarly applied elsewhere in mental health (e.g. mood disorders, ADHD), physical health (e.g., obesogenic behaviors, allergen-induced asthma attacks), and beyond. Once the environment-behavior relationship is operationalized in a predictive model, environment-based interventions and therapeutic environmental modifications can be developed. Finally, given concerns about the interpretability of deep learning, to the study demonstrates how a hybrid model (deep neural network+interpretable classifier) can achieve high performance on a prediction task while still providing clinical insight.

Methods

Study Design and Participants

Study participants were recruited from the Durham, N.C. (N=106) and Pittsburgh, Pa. (N=63) areas. Participants were active smokers (≥5 cigarettes per day for ≥1 year), ages 18-55, who were ambulatory, not currently ill, and not planning to quit during the study period. Those using smokeless tobacco or currently abusing alcohol or other drugs (verified with breath and urine samples) were excluded. All participants took photographs of up to four daily smoking environments and up to four daily nonsmoking environments. Smoking environments were defined as locations satisfying two of the following: (1) frequently visited (≥1×/week), (2) participant smokes ≥7 of every 10 times visited, (3) participant subjectively reports difficulty not smoking, and (4) participant rates their difficulty ≥5 on a 10 point scale. Nonsmoking environments were defined as locations satisfying two of the following: (1) frequently visited (≥1×/week), (2) participant smokes ≤3 of every 10 times visited, (3) participant infrequently thinks about smoking (≤5 on a 10 point scale), and (4) participant rates their difficulty not smoking ≤5 on a 10 point scale. For each environment, participants captured two images as they approached the environment and two from within it. Images were taken with a digital camera provided for the study, and participants were given both written and in-person camera use instructions. At a concluding study visit, a subset of Durham, N.C. participants (N=37) were shown images of 8 standard environments (see FIG. 4) and asked to report the craving they associated with each image on an 8-point scale. All study procedures were IRB-approved, and participants signed an IRB-approved informed consent form prior to participating after receiving a complete description of the study.

Classification Model

A statistical classifier was trained to identify the images taken by study participants as either smoking or nonsmoking environments.

Three approaches to classification comprising several specific classifiers were initially explored. Two were based on the Inception v4 CNN previously described (Approaches 1 and 2), and the third utilized a Faster-RCNN object detection network 1 based on the ResNet CNN architecture 2 and pre-trained on the Common Objects in Context (COCO) dataset (Approach 3). 3 All classifiers were trained and evaluated using nested cross-validation, 4 and the same CV partitions were used for each classifier. Numeric and categorical hyper parameters were selected as the median or mode, respectively, of the optimal values found in each inner loop. The final model was selected due to its competitive performance (i.e. no statistically significant differences compared to other Approach 1 models) and the interpretability and familiarity of logistic regression. The final classifier (Inception v4+L2-regularized Logistic Regression) had highest AUC and accuracy under all three validation schemes (i.e. trained via cross-validation with Durham images, trained via cross-validation with Pittsburgh images, trained via cross-validation with all images). However, several other Approach 1 models had similar performance; for example, a second Approach 1 model (Inception v4+MLP) had similar AUC when trained on Duke and combined image sets (0.855 and 0.828, respectively), and a third Approach 1 model (Inception v4+LDA) had similar accuracy (78.6% and 76.3%, respectively). Detailed performance for all classifiers (mean±SD of AUC and accuracy across all CV folds for all image sets) may be found in eTable 3. Differences in AUC between classifiers of the same approach were not statistically significant (p>10-4). In contrast, differences in AUC between approaches were statistically significant (p<10-4): Approach 1 performed better than Approach 2, which in turn performed better than Approach 3. The one exception was the Pittsburgh image set, where differences between Approaches 1 and 2 were not statistically significant (p>10-4).

Description of Approach 1-3 Classifiers

Approach 1: Inception v4+Classifier

These classifiers follow the approach described in the main text, in which the output logits from the pre-trained Inception v4 model were used as predictors to train a smoking/nonsmoking classifier in Scikit-learn 0.19.1.5 In addition to L2-regularized logistic regression, we explored: (1) L1-regularized logistic regression, (2) a multi-layer perceptron (MLP) with a single hidden layer, and (3) linear discriminant analysis. Hyperparameters tuned by nested CV included regularization parameters and the number of MLP hidden units.

Approach 2: Inception v4 Retraining

The Inception v4 network was modified and fine-tuned to directly classify images as smoking/nonsmoking. Specifically, the final two layers (logit and softmax) were modified for our two-class problem and randomly initialized. The network was then trained in Tensor flow via stochastic gradient descent (ADAM optimizer 6, learning rate=10-4, dropout pkeep=0.8) with mini-batches of 60 images to minimize average cross-entropy over the training set for each outer fold. The number of training epochs was chosen by nested CV: training proceeded until average cross-entropy over the inner fold validation set exceeded 105% of its minimum.?

Approach 3: Faster-RCNN-ResNet+Classifier

A COCO-trained Faster-RCNN-ResNet model was directly applied to all images via Tensorflow to detect objects included in the 90 COCO object classes. Object class counts were then taken as predictors for a classification model trained on the current dataset. Five classifiers were explored: (1) L1- and (2) L2-regularized logistic regression, (3) multi-layer perceptron with a single hidden layer, (4) Bernoulli naïve Bayes, and (5) multinomial naïve Bayes. These classifiers were implemented in Python 3.5 via Scikit-learn 0.19.1.

Objects Per Image

The number of objects detected per image (via Faster-RCNN-ResNet) was higher for the Durham images ($p=0.004$), with a greater proportion of images having $\geq 2$ objects (77.7% Durham, 68.5% Pittsburgh; $p<0.001$).

Figure 5:
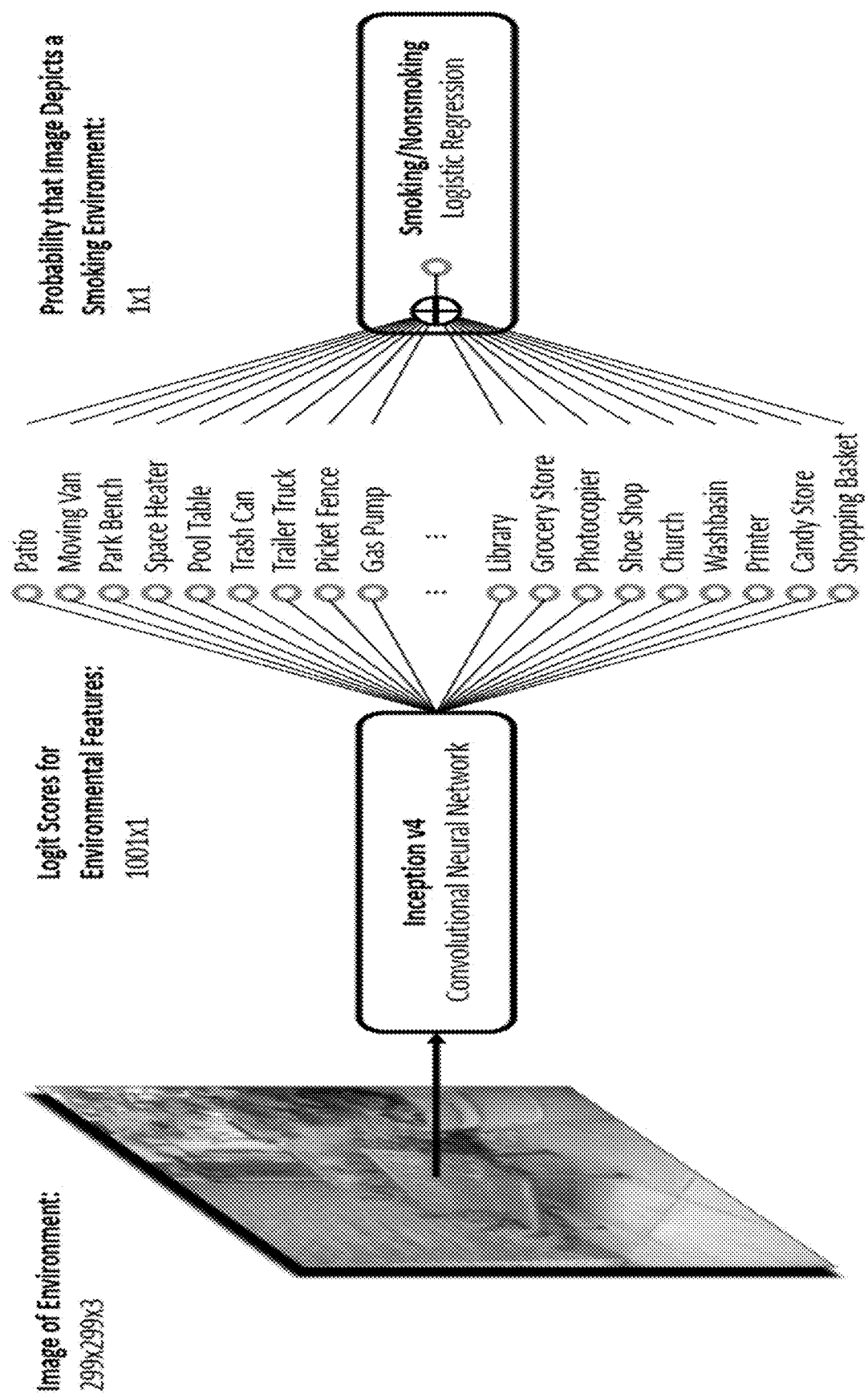
FIG. 5 is an illustration of the classification model, which extracts image features using the Inception v4 convolutional neural network, then applies logistic regression to these features to classify the images as a smoking environment or nonsmoking environment. The lists represent objects/settings most likely to be present in the image, in order, according to Inception v4 in accordance with one embodiment of the present disclosure.

The final classifier combines a pre-trained image classification network—the Inception v4 convolutional neural network (CNN) trained for the ImageNet large-scale visual recognition challenge (ILSVRC)—with a logistic regression model trained on the current dataset. Importantly, this approach is consistent with the unmodified Inception v4 architecture, which uses a softmax (i.e. multinomial logistic) function as its final layer (Szegedy C, et al., (2017) *Proceedings of the Thirty-first AAAI Conf on Artificial Intelligence*, 4278-4284), as well as the modified architectures used in other clinical applications. Esteva A, et al. (2017) *Nature*. 542(7639):115-118. The first portion of the model provides information about image content in terms of 1000 categories from ImageNet. Many of these categories are common objects or locations such as patio, trash can, library, desk, and printer. The second portion relates information about the presence or absence of these features (i.e. logit scores) to the probability that the image depicts a smoking environment versus a nonsmoking environment. Together they constitute a single model trained to classify images as smoking or nonsmoking, as illustrated in FIG. 5.

The pre-trained Inception v4 model was directly applied to all images. Logit values for all ILSVRC categories from Inception v4 were then taken as predictors for an L2-regularized logistic regression model, in which the sum of squared model parameters is penalized to reduce overfitting. All models were implemented in the Tensorflow (v1.3.0) and/or Scikit-learn (v0.19.1) machine learning frameworks for Python (v3.5).

Model Training and Evaluation

Three separate validation schemes were used to evaluate performance both within and between the two geographic areas (Durham and Pittsburgh). In the first validation scheme (V1), the model was initially developed and validated using images from Durham, then applied to the Pittsburgh images for secondary validation. In the second scheme (V2), this was reversed: a model initially developed and validated using the Pittsburgh images was later applied to the Durham images. In the third scheme (V3), the model was developed and validated with all images jointly.

Model training, tuning, and validation took place jointly using nested cross-validation (CV) during development. The nested CV procedure avoids the biased error estimates obtained when hyperparameters are chosen to minimize outer loop error. During nested CV, study participants were partitioned into 10 groups (i.e. folds). For each group, a model was trained on images from participants not in that group, then evaluated on images from all participants in the group. 5 folds were used in the inner loops. The regularization parameter for each outer fold was chosen as the median of the optimal values found in the inner folds. CV folds were defined by participant, so that all images from a given participant were assigned to the same fold. In particular, this prevented images of the same environment from being split across folds.

Manual Classification by Experts

To contextualize classifier performance, images from a randomly selected subset of the participants (25 total: 16 Durham, 9 Pittsburgh; 732 total images) were classified by four smoking cessation experts (faculty and postdoctoral fellows) from the Duke University Department of Psychiatry and Behavioral Sciences who were not familiar with the current participants or dataset. Experts were instructed to classify each image (yes/no) based on the following question: "Would you warn a smoker that this is an environment in which they might smoke or be tempted to smoke?". Performance was quantified in terms of sensitivity, specificity, and accuracy with respect to the image labels (smoking/nonsmoking).

Statistical Analyses

Performances of different classifiers on the same images were compared by Delong test. Performances of a single classifier between cohorts (Durham/Pittsburgh) were compared by two-sample proportion test. Faculty member performance was compared to classifier performance by taking the sensitivity/specificity pair closest to the expert's performance, then comparing classification at that threshold to the expert's performance by McNemar test. The number of objects detected in each cohort were compared by chi-square test and Mann-Whitney U test.

The importance of ImageNet classes to the final smoking/nonsmoking classification model has been quantified using standardized logistic regression coefficients, which were scaled by the standard deviation of the corresponding predictor. To adjust for the multiple comparisons in these analyses, classifier performance comparisons are considered statistically significant only when $p<10^{-4}$.

Self-reported craving data for the 8 standard environment images were compared by Mann-Whitney U test, and associations between median craving and classifier predictions were compared by Spearman correlation.

Results

A total of 4902 images (3386 Durham, 1516 Pittsburgh) were available for analysis, for an average of 31.9±1.3 images per Durham participant and 24.1±0.5 images per Pittsburgh participant. Images were evenly split between the two classes, with 2457 smoking images and 2445 nonsmoking images (50.1% smoking). Participant demographics may be found in Table 2.

TABLE 2

Demographics of Durham, NC and Pittsburgh, PA participants.

| | All | Durham | Pittsburgh | p-value |
|---|---|---|---|---|
| N | 169 | 106 | 63 | |
| Age, mean ± SD [range] | 39.1 ± 13.0 [18-65] | 41.4 ± 12.0 [19-65] | 35.2 ± 13.8 [18-63] | 0.003 |
| Sex, F:M, (% F) | 84:82 (50.6%) | 53:53 (50.0%) | 31:29 (51.7%) | 0.96 |
| Race, N (%) | | | | <0.001 |
| White | 87 (52.4%) | 43 (40.6%) | 44 (73.3%) | |
| American Indian | 0 (0.0%) | 0 (0.0%) | 0 (0.0%) | |
| Asian | 7 (4.2%) | 4 (3.8%) | 3 (5.0%) | |
| Black | 68 (41.0%) | 58 (54.7%) | 10 (16.7%) | |
| Native Hawaiian/ Pacific Islander | 0 (0.0%) | 0 (0.0%) | 0 (0.0%) | |
| More than one | 4 (2.4%) | 1 (0.9%) | 3 (5.0%) | |
| Unknown/other | 0 (0.0%) | 0 (0.0%) | 0 (0.0%) | |
| Ethnicity, N (%) | | | | 0.37 |
| Non-Hispanic | 161 (97.0%) | 103 (97.2%) | 58 (96.7%) | |
| Hispanic | 1 (0.6%) | 0 (0.0%) | 1 (1.7%) | |
| Unknown | 4 (2.4%) | 3 (2.8%) | 1 (1.7%) | |
| FTND Total, median [IQR] [range] | 5 (3-6) [0-10] | 5 (3-6) [0-10] | 4 (3-6) [0-10] | 0.80 |
| Cigarettes per day, mean ± SD [range] | 15.3 ± 6.3 [4-40] | 14.8 ± 6.6 [4-40] | 16.1 ± 5.6 [10-40] | 0.07 |

*Demographics not available for 3 Pittsburgh participants
SD: standard deviation;
IQR: interquartile range;
FTND: Fagerstrom Test for Nicotine Dependence.

Classifier Performance

FIG. 6A-6D shows the performance of our final model under all three validation schemes. The final model combines Google's publicly-available Inception v4 network with a logistic regression model; results for alternative models are presented in Table 3.

Figure 6A:
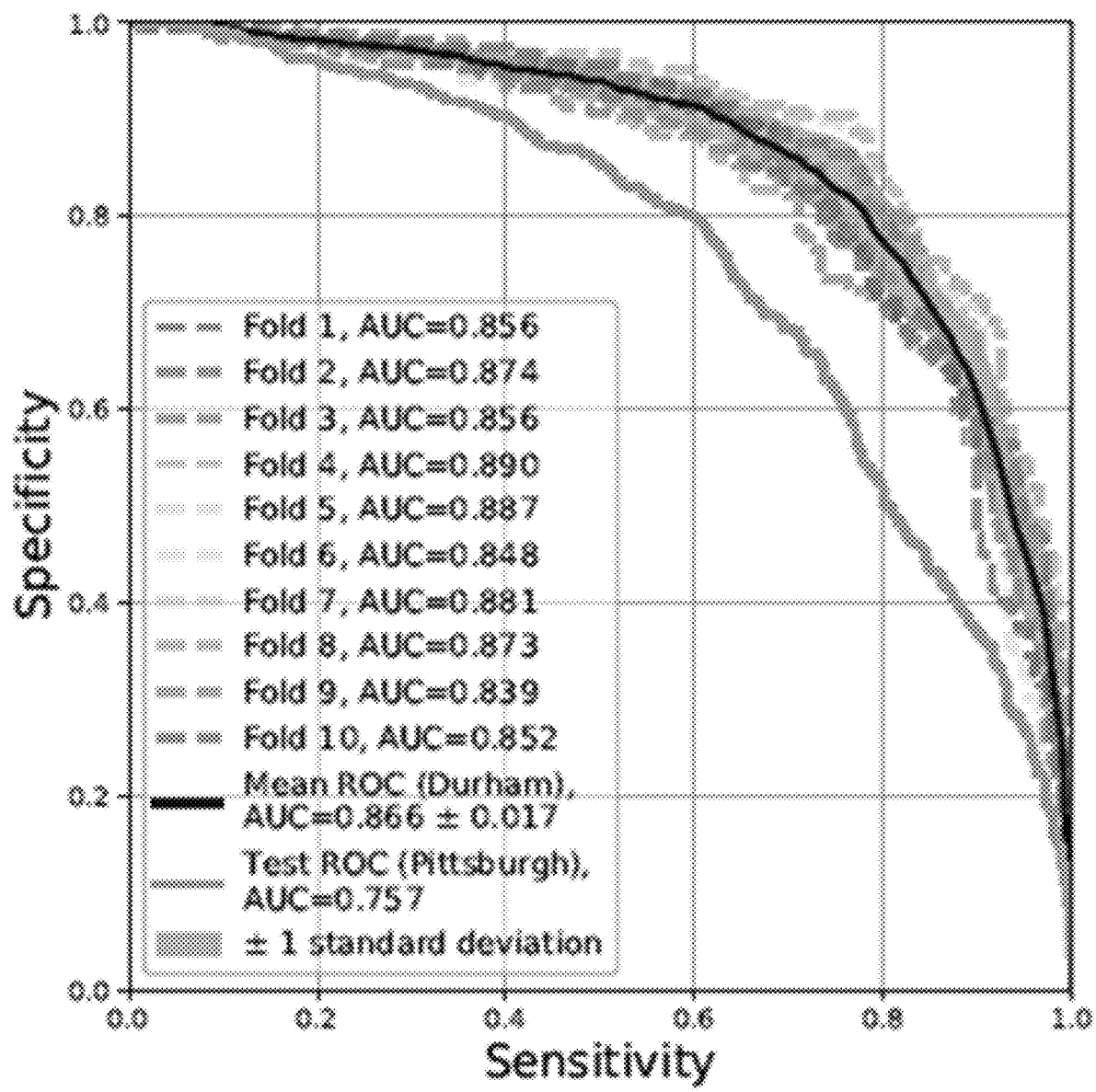
FIG. 6A-6D are graphs showing the sensitivity/specificity for the final classifier trained and evaluated using nested cross-validation. In the cross-validation procedure, study participants were partitioned into 10 groups. For each group, a model was trained on images from participants not in that group, then evaluated on images from all participants in the group. The figure shows the mean± standard deviation of sensitivity/specificity curves for all 10 groups.
Figure 6B:
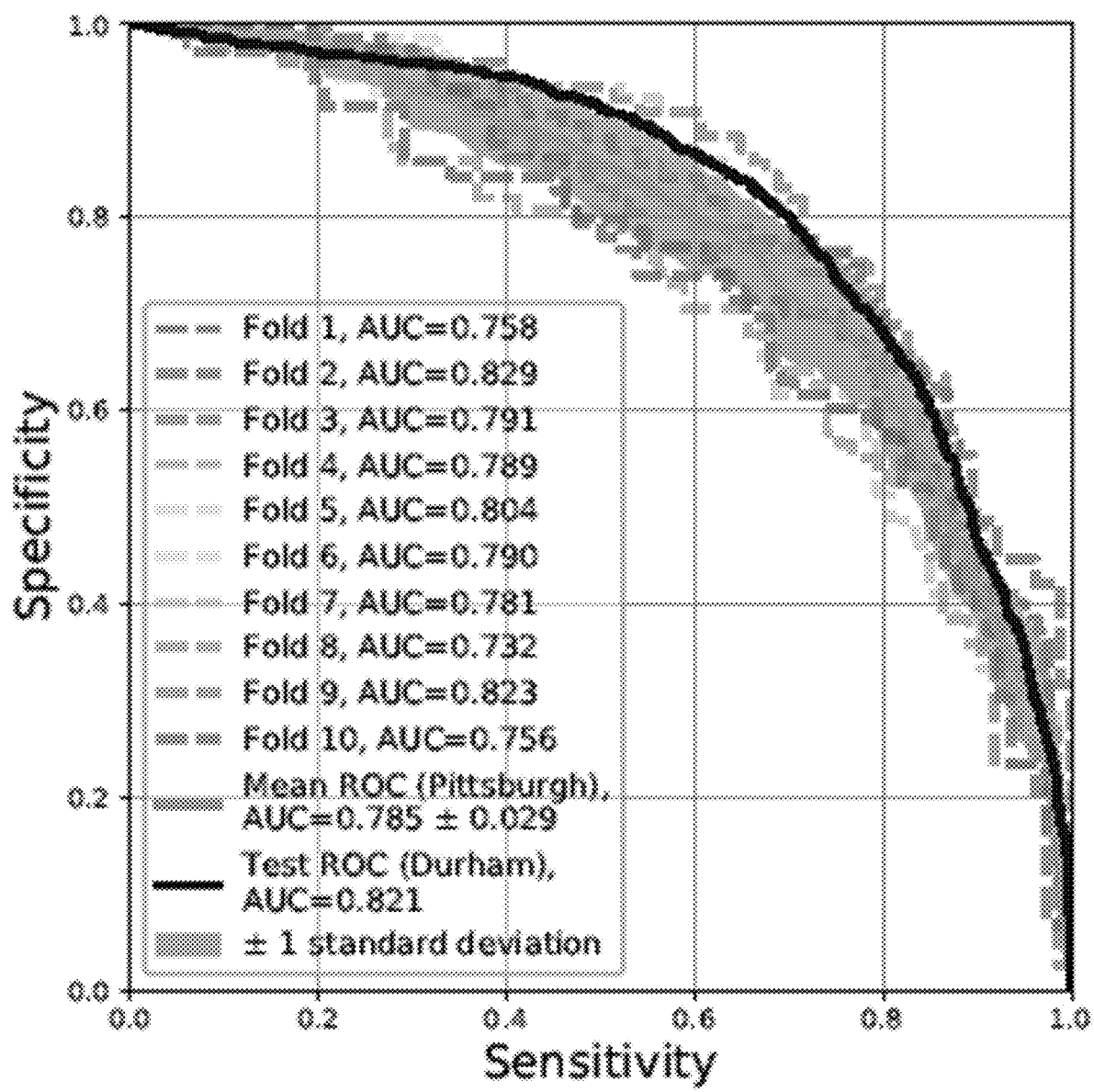
Figure 6C:
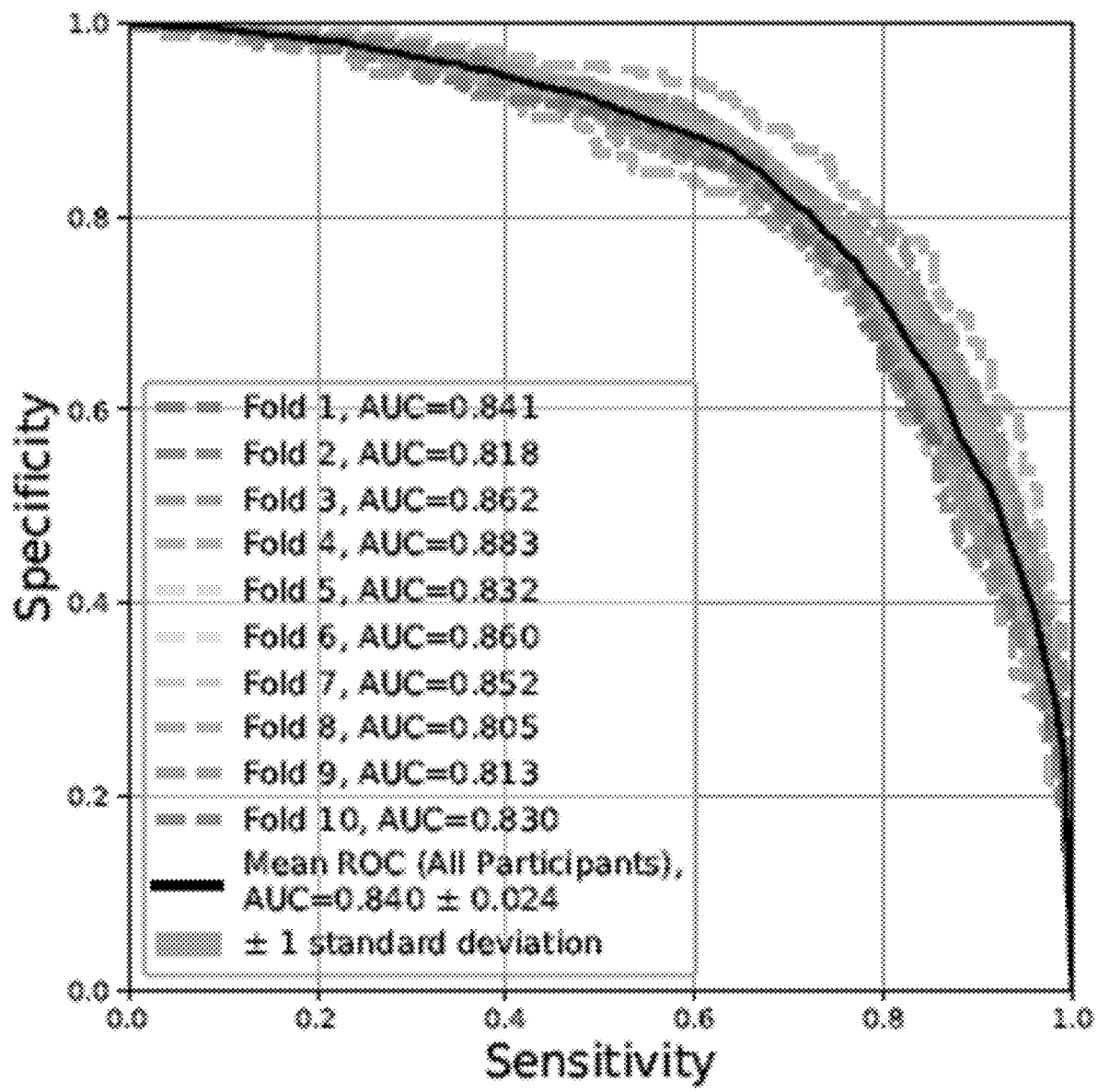

Average AUC across all CV folds for the combined image set (V3) was 0.840±0.024 (accuracy=76.5±1.6%) (FIG. 6C). When trained on Durham images (V1), mean AUC from cross-validation (Durham) was 0.866±0.017 (accuracy=78.9±2.3%) compared to 0.757 (accuracy=69.2%) when applied to the Pittsburgh images (FIG. 6A). This

TABLE 3

Detailed Classifier Performance

| | | Durham | | | | Pittsburgh | | | | Both | | | |
|---|---|---|---|---|---|---|---|---|---|---|---|---|---|
| Approach | Details | Avg Acc | STD Acc | Mean AUC | STD AUC | Avg Acc | STD Acc | Mean AUC | STD AUC | Avg Acc | STD Acc | Mean AUC | STD AUC |
| Inception v4 pre-trained + classifier | MLP -- 1 hidden layer | 77.7% | 5.3% | 0.855 | 0.043 | 68.7% | 3.1% | 0.752 | 0.047 | 75.0% | 2.4% | 0.828 | 0.024 |
| | Logistic Regression -- L2 Reg | 78.9% | 2.3% | 0.866 | 0.017 | 72.2% | 3.1% | 0.785 | 0.029 | 76.5% | 1.6% | 0.840 | 0.024 |
| | Logistic Regression -- L1 Reg | 77.9% | 5.2% | 0.846 | 0.049 | 69.1% | 5.4% | 0.754 | 0.064 | 74.9% | 3.0% | 0.824 | 0.027 |
| | LDA | 78.6% | 5.0% | 0.849 | 0.05 | 68.7% | 4.2% | 0.748 | 0.056 | 76.3% | 3.3% | 0.826 | 0.03 |
| Inception v4 fine-tuned | SGD, ADAM Optimizer | 75.9% | 5.5% | 0.826 | 0.058 | 67.2% | 6.3% | 0.733 | 0.080 | 72.7% | 3.4% | 0.798 | 0.032 |
| Faster-RCNN ResNet COCO pre-trained + classifier | Bernoulli Naïve Bayes | 68.7% | 5.3% | 0.742 | 0.064 | 59.7% | 6.5% | 0.61 | 0.085 | 67.0% | 2.4% | 0.702 | 0.031 |
| | Multinomial Naïve Bayes | 65.6% | 4.7% | 0.742 | 0.061 | 59.5% | 7.7% | 0.623 | 0.088 | 63.8% | 3.0% | 0.707 | 0.033 |
| | Logistic Regression -- L2 Reg | 69.6% | 4.6% | 0.752 | 0.059 | 58.2% | 6.8% | 0.62 | 0.087 | 66.3% | 2.8% | 0.713 | 0.033 |
| | Logistic Regression -- 1 Reg | 68.8% | 4.7% | 0.751 | 0.059 | 55.5% | 5.3% | 0.62 | 0.081 | 65.6% | 2.6% | 0.709 | 0.035 |
| | MLP -- 1 hidden layer | 69.3% | 5.8% | 0.747 | 0.063 | 57.1% | 4.6% | 0.622 | 0.074 | 66.3% | 2.8% | 0.709 | 0.036 |

Performance statistics are broken down by approach (Inception v4+Classifier, Inception v4 Retraining, or Faster-RCNN-ResNet+Classifier), final-layer classifier (e.g. logistic regression, multi-layer perceptron), and training cohort(s) (Durham, Pittsburgh, or both).

difference persisted when trained on Pittsburgh images (V2): mean AUC from cross-validation (Pittsburgh) was 0.785±0.029 (accuracy=72.2±3.1%), compared to 0.821 (accuracy=75.0%) when applied to the Durham images (FIG. 6B). Thus, test performance was higher on the Durham images regardless of which training set was used ($p<10^{-4}$). However, including the Durham images in the training set (V1, V3) did improve results compared to training with the Pittsburgh images alone (V2; $p<10^{-4}$).

Comparison to Experts

Figure 6D:
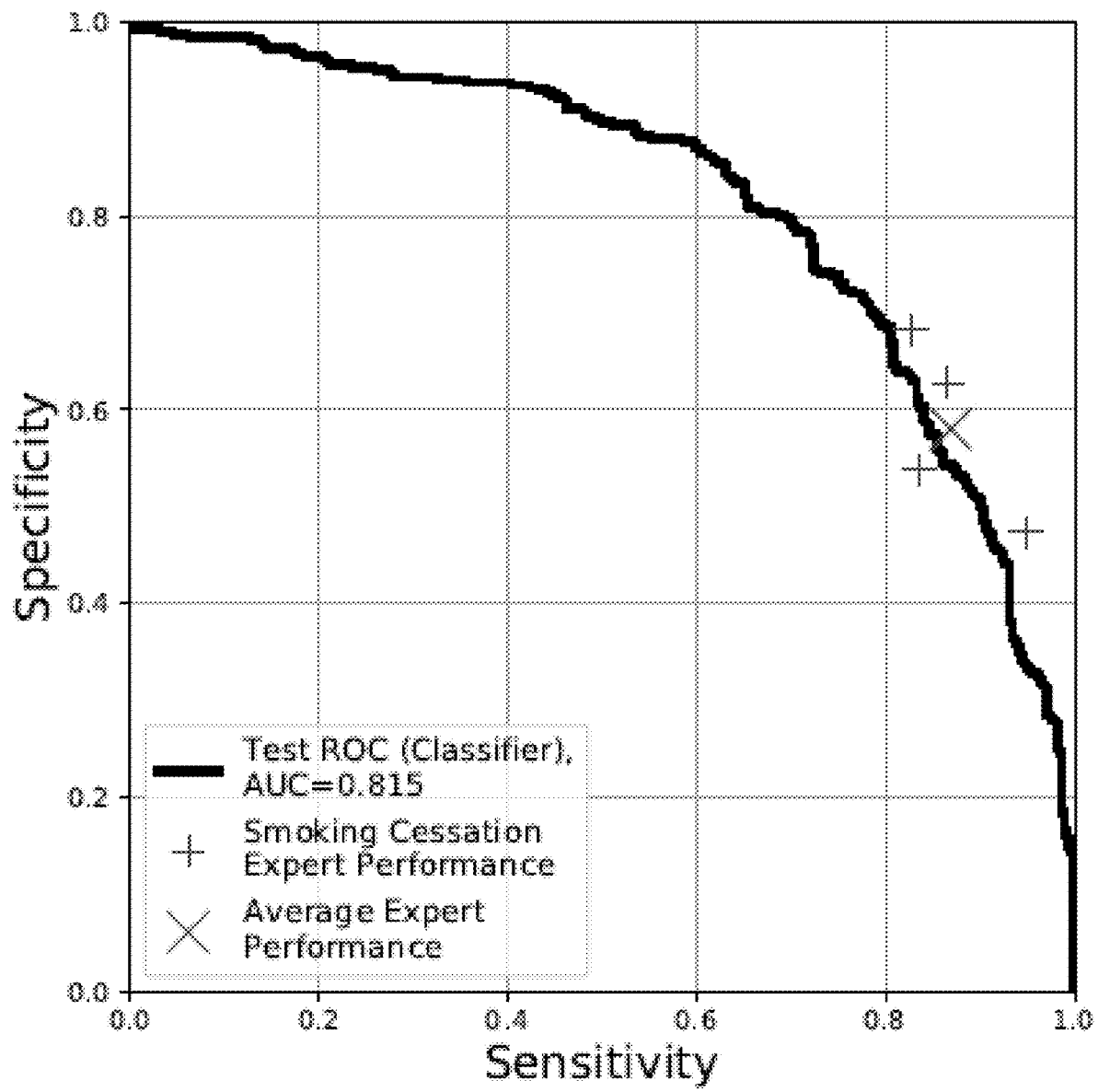

Three of four experts' performance (see Table 4) was above the sensitivity/specificity curve for the classifiers trained under schemes V1-V3, as shown in FIG. 6D. However, these differences were statistically significant only for Expert A, who outperformed the Pittsburgh-trained classifier (V2) on Pittsburgh images (p=0.001) and the final classifier (V3) on the combined image set (p=0.03), but not the Durham-trained classifier (V1) on Durham images (p=0.70).

TABLE 4

Expert Classification Details

| Image Set | Addiction Faculty Member | True Pos | True Neg | False Pos | False Neg | Sens | Spec | Acc |
|---|---|---|---|---|---|---|---|---|
| Durham | A | 243 | 120 | 140 | 13 | 0.949 | 0.462 | 0.703 |
|  | B | 218 | 140 | 120 | 38 | 0.852 | 0.538 | 0.694 |
|  | C | 221 | 165 | 95 | 35 | 0.863 | 0.635 | 0.748 |
|  | D | 223 | 178 | 82 | 33 | 0.871 | 0.685 | 0.778 |
|  | Average | 226.25 | 150.75 | 109.25 | 29.75 | 0.884 | 0.580 | 0.731 |
| Pittsburgh | A | 102 | 54 | 54 | 6 | 0.944 | 0.500 | 0.722 |
|  | B | 86 | 58 | 50 | 22 | 0.796 | 0.537 | 0.667 |
|  | C | 94 | 66 | 42 | 14 | 0.870 | 0.611 | 0.741 |
|  | D | 78 | 73 | 35 | 30 | 0.722 | 0.676 | 0.699 |
|  | Average | 90 | 62.75 | 45.25 | 18 | 0.833 | 0.581 | 0.707 |
| Combined | A | 345 | 174 | 194 | 19 | 0.948 | 0.473 | 0.709 |
|  | B | 304 | 198 | 170 | 60 | 0.835 | 0.538 | 0.686 |
|  | C | 315 | 231 | 137 | 49 | 0.865 | 0.628 | 0.746 |
|  | D | 301 | 251 | 117 | 63 | 0.827 | 0.682 | 0.754 |
|  | Average | 316.25 | 213.5 | 154.5 | 47.75 | 0.869 | 0.580 | 0.724 |

Results of Classification of a Random Sample of 732 Images (516 Durham, 216 Pittsburgh) by Addiction Division Faculty.

Image-Associated Craving

Figure 7:
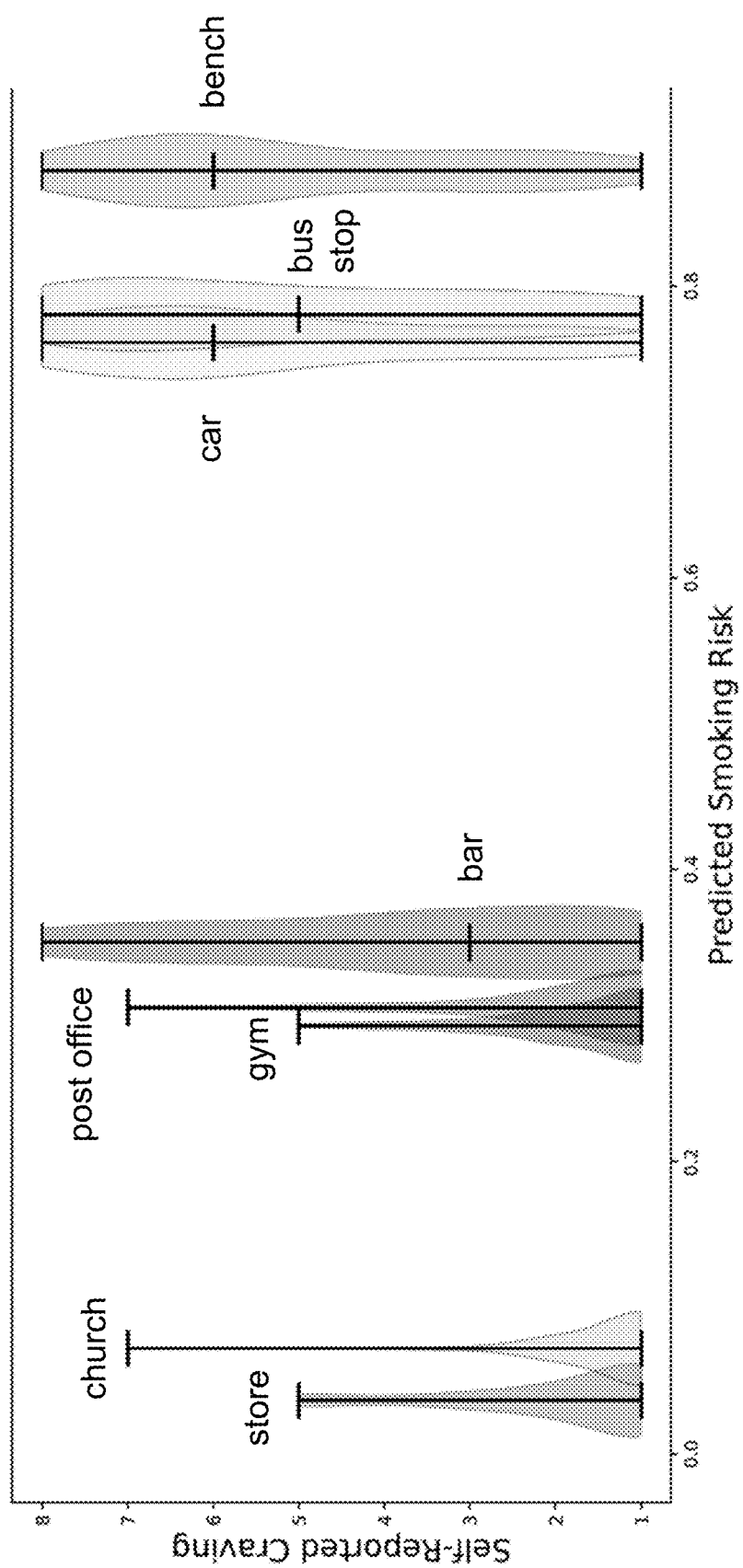
FIG. 7 are graphical plots showing the relationship between model-predicted smoking risk and self-reported craving for images of 8 daily environments. The same images were viewed by all participants, who then reported their level of craving. Horizontal bars indicate the median, lowest, and highest values reported. The figure shows the distribution of craving for all participants. X-axis placement indicates smoking risk predicted by the model for that environment. The tar' environment, which had lower predicted smoking probability than the other smoking environments, was also associated with lower craving (p<0.01) in accordance with one embodiment of the present disclosure.

Classifier-predicted smoking probability for the 8 standard environments was correlated with median craving reported for that image by the study participants (rs=0.894, p=0.003) (FIG. 7).

The classifier predicted the bar environment as much lower smoking risk (35% probability) compared to the other standard smoking environments (>75% probability), and indeed, self-reported craving was lower for bar than the other three (p<0.01). Predicted risk and self-reported craving were lower for all standard nonsmoking environments compared to all standard nonsmoking environments (p<0.01).

Classifier Interpretation

Examination of the logistic regression coefficients (Table 5) shows that patio and moving van most strongly influence the model to predict smoking, whereas library, grocery store, and photocopier most strongly influence it to predict nonsmoking.

TABLE 5

Environmental Features Ranked by Standardized Logistic Regression Coefficients

| Ranking | SMOKING | NONSMOKING |
|---|---|---|
| 1 | Patio | Library |
| 2 | Moving Van | Grocery Store |
| 3 | Park Bench | Photocopier |
| 4 | Space Heater | Shoe Shop |
| 5 | Pool Table | Church |
| 6 | Trash Can | Washbasin |
| 7 | Trailer Truck | Printer |
| 8 | Picket Fence | Candy Store |
| 9 | Gas Pump | Shopping Basket |
| 10 | Lumber Mill | Day Bed |
| 11 | Cassette Player | Wardrobe |
| 12 | Entertainment Center | Shopping Cart |
| 13 | Snake-rail Fence | Bookstore |
| 14 | Mosquito Net | Desk |
| 15 | Sundial | Quilt |

Objects and settings detected by Inception v4 have been ranked by the magnitude of their associated standardized coefficients in the final logistic regression model. Those with the largest positive coefficients are listed as 'smoking,' while those with the largest negative coefficients are listed as 'nonsmoking.'

Figure 8A:
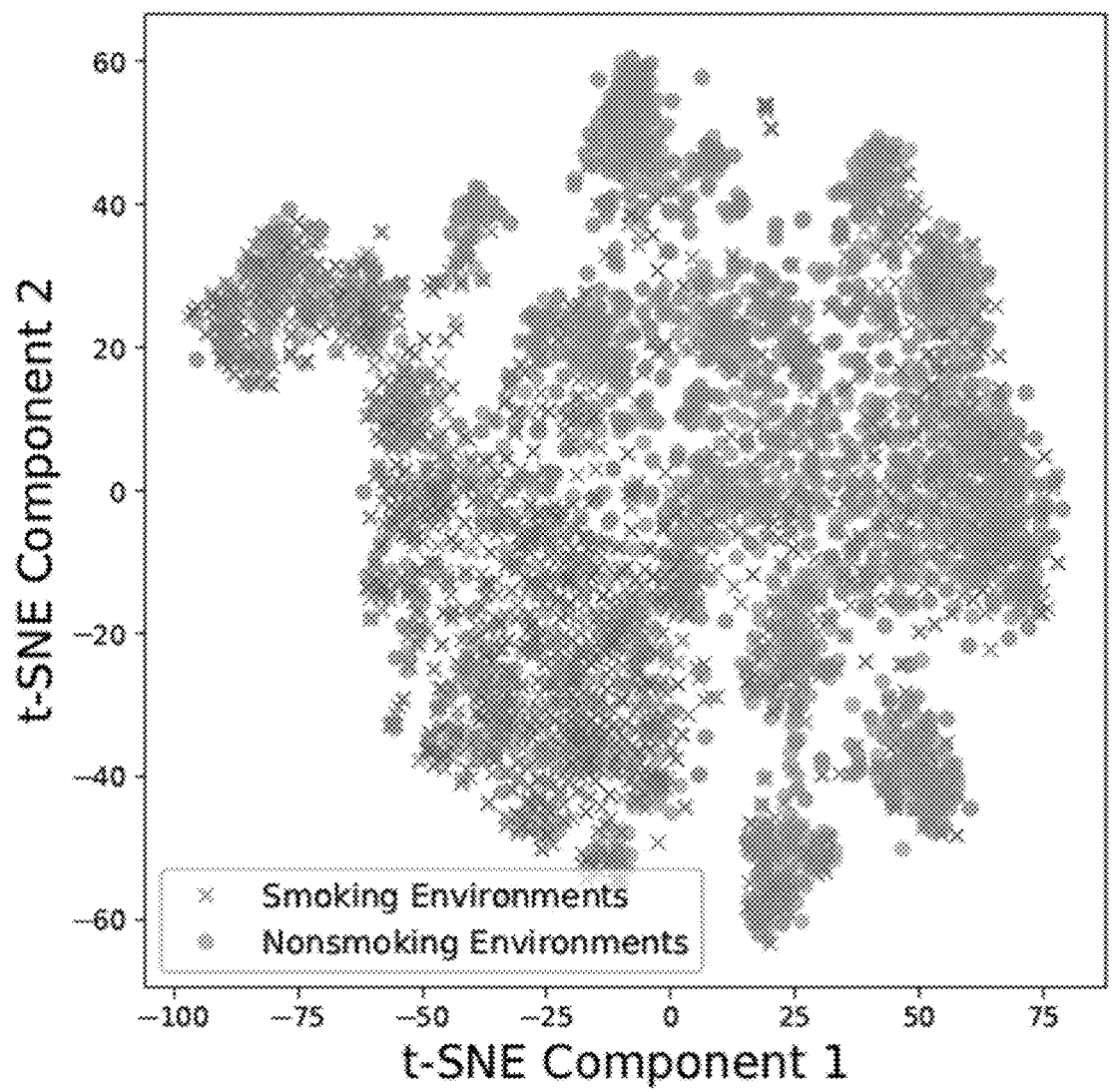
FIG. 8A-8B are graphs showing two-dimensional representations of all images learned by applying t-SNE (unsupervised) and LDA (supervised) to the image features extracted by Inception v4.

Additionally, several pieces of furniture are suggestive of nonsmoking (e.g. wardrobe, desk), but pool table and entertainment center are suggestive of smoking. FIG. 8A shows a two-dimensional representation of the image content extracted by Inception v4.

Figure 8B:
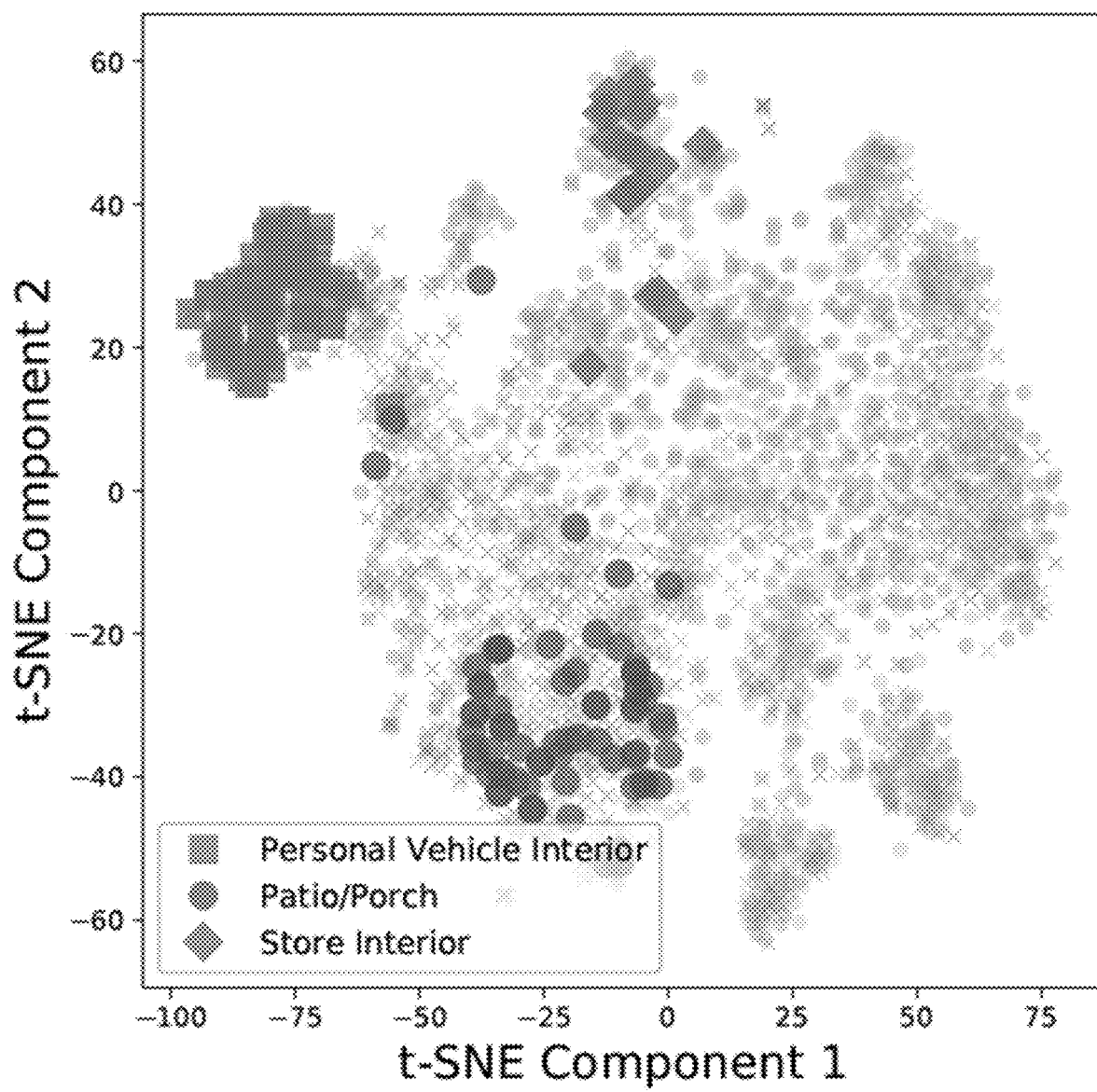

This representation was generated using t-stochastic neighbor embedding, a dimensionality reduction technique for visualizing high-dimensional data. FIG. 8B shows the locations of selected images manually identified as store interiors, patios, and personal vehicles within this representation.

Discussion

This study is the first to apply deep learning to the clinically-important problem of predicting whether daily environments are associated with smoking. A classifier comprised of a pre-trained classification network (Google's Inception v4) coupled with a final logistic regression layer was trained and tested on a large set of smoking and nonsmoking environments photographed by smokers. The final model achieved accuracy (76.5%) significantly better than chance and comparable to human experts, and results generalized between participants and geographically distinct cohorts. When applied to unfamiliar, previously unseen environments, the model's predictions were highly correlated with participant-reported craving associated with those environments. This demonstrates that environmental patterns associated with smoking confer risk wherever they are encountered.

Because a highly interpretable approach was selected, this work also represents an important step toward identifying specific environmental features associated with tobacco smoking, which is the leading cause of preventable disease and death in the U.S. In clinical practice, smokers are frequently asked to identify situations and places associated with smoking (i.e. triggers) and encouraged to avoid or cope with these situations when they quit. In contrast, this approach uses deep learning to automatically identify objects and settings associated with smoking, and can be fine-tuned to identify an individual smoker's specific environmental triggers given adequate initial training. The model differentiates between public settings likely to be associated with smoking (e.g. park bench, gas pump) versus not likely (e.g. grocery store, church), and between home settings likely to be associated with smoking (e.g. patio, entertainment center) versus not likely (e.g. washbasin, wardrobe). Importantly, however, the model considers all objects/settings jointly when making its predictions.

Whereas in the current research, smoking environment status was predicted from photographs taken by smokers and then brought into the lab, a similar approach can be applied to predict smoking risk in real time. Additionally, this approach can be applied to trigger just-in-time adaptive cessation interventions, optimize a smoker's environment during a quit attempt, or study environmental correlates of other behaviors. Just-in-time adaptive interventions (JITAIs) depend on quick and accurate prediction of risk (i.e. just in time) and information about the nature of the risk to deliver situationally relevant (i.e. adaptive) interventions. A JITAI can be used wherein images from a personal, wearable camera or smartglasses are assessed on an ongoing basis to quantify smoking risk and trigger an intervention when risk is high. By choosing a high-sensitivity operating point (e.g. 90% sensitivity and 50% specificity; see FIG. 6A-6C), the current model can be used to trigger a JITAIs supporting smoking cessation. Environments where smoking takes place and those that increase urge, which may be critical to the success of an environment-based intervention can be determined through ecological momentary assessment of craving, or by analyzing a sequence of images taken in the moments leading up to a smoking event.

Connecting the external environment to smoking risk also opens the door to a range of environment-based interventions, in which information about pro-smoking environments can be utilized during a quit attempt. For example, images of a potential destination (e.g. acquired from a website) can be analyzed before visiting to estimate whether that environment might increase craving. In this way, the approach could be used to preempt lapse triggers in addition to identifying them in real time. Alternatively, the model can support therapeutic environmental modifications, in which environments are designed to incorporate features promoting healthy behaviors, and features contributing to unhealthy behaviors are systematically identified and altered. For example, images collected during a failed quit attempt can be analyzed to pinpoint environmental factors associated with lapse/relapse. Working together with a clinician, the smoker might then remove these factors from their personal environments before their next quit attempt to increase its chance of success.

To support these applications, it is important that all prediction was across participants (i.e. out of sample prediction). This is ensured by the participant-wise partitions used in our nested CV procedure. In other words, predictions for a given participant were made by a model trained only on other participants. In fact, the model also generalized well between geographically distinct cohorts (Durham, Pittsburgh), and accurately predicted the level of craving our participants associated with locations they had not previously seen. The model can be capable of predicting smoking risk associated with a range of familiar and unfamiliar environments encountered in daily life. Importantly, it relies only on features in the surrounding environment and not on proximal smoking cues, which might provide information about smoking not related to the environment itself.

Although the results generalize across participants, personalization can further improve model performance by identifying objects and settings associated with smoking on an individual basis. A personalized approach would ensure that performance is consistent across distinct groups of smokers, such as those who smoke in the home versus those who do not. The model can be personalized by fine-tuning the parameters of its final layer, which directly relates objects and settings detected in daily environments to smoking environment status. Other technical strengths of this work include our exploration of multiple deep learning approaches (see eTable 3) and the robustness of the results when varying the final classification layer (e.g. linear discriminant analysis, multi-layer perceptron).

However, this work has limitations. First, participants in the parent studies were instructed to photograph locations where smoking was highly likely and highly unlikely. A larger, more naturalistic image set is needed to show that accurate prediction extends to the full range of environments encountered in smokers' daily lives. Second, some objects/settings (e.g. personal vehicles) were smoking environments for some participants and nonsmoking environments for others (see FIG. 7), which may suggest that there are more subtle differences between these environments that the architecture is not able to identify. Alternatively, this distinction can be resolved by personalized models, which would require a larger dataset with more comprehensive coverage of each participant's daily environments. Third, the prediction model is limited by the objects and settings identified by Inception v4, and does not account for interactions between environmental features or higher-order features (e.g. inside/outside) that may be important determinants of smoking status. In subsequent work, it may be important to revisit the effectiveness of alternative, hierarchical classification models if trained using a larger dataset. Fourth, smokers were instructed to remove proximal smoking cues (e.g. lighters, cigarettes) before photographing their environment to avoid cue reactivity in the parent study. As previously discussed, this was an important strength of this work, because it allowed the influence of the external environment on smoking risk to be isolated. However, retraining on image sets that include these objects may allow us to improve performance for the purpose of triggering a JITAI. Last, smokers in these studies were adult, daily, non-treatment seeking smokers who smoke ≥5 cigarettes/day.

Conclusions

Classifier performance (AUC and accuracy); comparison to smoking cessation experts (n=4); contribution of objects/settings to smoking environment status (standardized model coefficients); and correlation with participant-reported craving. The final model discriminated smoking/nonsmoking environments with 0.840 AUC (75.3% accuracy). Models trained on geographically distinct subgroups performed equally well when evaluated on the same data (p>0.05), suggesting good generalizability. Only one expert's performance was a statistically significant improvement over the classifier ($\alpha$=0.05). Median self-reported craving was significantly correlated with model-predicted smoking environment status (rs=0.894, p=0.003).

This research demonstrates that objects and settings found in images of daily life can be used to identify smoking environments, which may in turn be an effective proxy for craving and smoking risk. Further, environment-based risk predictions generalize between participants and geographic locations, suggesting that specific environmental patterns are consistently associated with smoking. A deep learning approach can be used to a) identify environmental features associated with, and antecedent to, smoking behavior, b) predict smoking/nonsmoking status associated with any image of daily life, and c) trigger just-in-time, adaptive, environment-based cessation interventions. Each of these directions can be coupled with existing self-monitoring interventions to improve our ability to help smokers quit, in turn reducing disease and death from smoking. More broadly, this work demonstrates a framework for interpreting and predicting the influence of daily environments on other target behaviors or symptoms, one with numerous applications in mental health (e.g. mood disorders, ADHD), physical health (e.g. obesogenic behaviors, allergen-induced asthma attacks), and beyond. Understanding how the external environment affects behaviors or symptoms of interest could open the door for environment-based interventions and therapeutic environmental modifications.

Example 2: Improved Classification of Smoking and Nonsmoking Environments

In order to improve the classification of smoking and nonsmoking environments, the inventors will a) train a deep neural network to identify smoking-related objects, and b) develop statistical models that predict smoking behaviors based on objects detected in participants' daily environments. By using this two-stage, hybrid model, recent advances in deep learning for object detection was leveraged, while preserving model interpretability and the ability to train on a study population of modest size. This Example is motivated by preliminary results suggesting that performance and interpretability of smoking/nonsmoking environment classification could be improved by identifying smoking-related objects.

Upon completion, the models will predict a) whether images were taken during a smoking-initiated or prompted assessment, and b) smoking risk associated with the image. These two models are closely related, but the former is a classification model and the latter is a time-series risk model. Predictor variables will include detected objects as well as time of day, day of the week, and the previously described baseline measures. Both models will be designed for deployment as a JITAI (Just-In-Time-Adaptive-Interventions) for smoking cessation.

Objects Detector. A list of approximately 100 objects commonly found in daily environments—50 associated with smoking (AW-S; e.g. ashtray, cigarette pack) and 50 associated with not smoking (AW-NS; e.g. baby crib, no smoking sign)—will be generated based on (1) the lists given by study subjects, (2) lists created by members of our research staff, and (3) objects identified as significant in the preliminary results, including through manual inspection. A final list will be curated by agreement of the research staff. Over 1000 labeled images of each object will be gathered from publicly available image databases such as ImageNet whenever possible; otherwise images will be gathered following the approach used to construct ImageNet, which relies on Amazon Mechanical Turk for image verification and labeling.

The smoking-objects detector itself will utilize a region-based CNN based on the Inception v4 architecture, which currently achieves state of the art image classification accuracy. Its predecessor, Inception v3, was recently trained to identify skin lesions with greater accuracy than the average dermatologist. The region-based CNN approach is advantageous in our application, because it allows multiple objects to be identified and located within each image. Similar to the methods described in the preliminary results, images will be partitioned into training, validation, and test sets; and training will be conducted in Tensorflow via stochastic gradient descent with the specific optimization algorithm, learning rate, and other parameters tuned as needed to optimize learning.

Predictor Variables. Images acquired from all participants will be analyzed with the smoking-objects detector to estimate which AW-Ss are present in the images, thus converting each image into a feature vector suitable for regression analyses. This AW-S feature vector along with time of day, day of the week, participant demographics, and other baseline variables will serve as predictor variables (or 'predictors') for all prediction models. Sex differences in nicotine reward/reinforcement and smoking cessation outcomes have been observed; this variable will be included among the demographic predictors in the analyses.

Environment Classification. Supervised learning will be used to train a simple logistic regression model to classify assessments as smoking-initiated or prompted based on the image for that assessment and all other predictors. This is a variation on the classification task described in the preliminary results—in which the locations themselves were labeled—due to the longitudinal, more ecologically valid design of the proposed study. Each assessment (both smoking-initiated and prompted) will constitute a single predictor/prediction pair. L1 and L2 regularization will be explored to limit model variance and complexity, and to improve model interpretability. When applied to a previously unseen image, this model will predict the probability that the image corresponds to a smoking occurrence, which may be used as a proxy for (a) the probability that the location is a smoking environment, or (b) the risk of smoking associated with that environment.

Time-Series Modeling of Smoking Risk. Smoking assessments will also be fitted to a time-series model to more rigorously capture the temporal dynamics of smoking risk as a function of the predictors. Unlike the simple logistic regression model, this model aims to predict when smoking is most likely to occur, which may have distinct dependence on the predictors. Smoking occurrences will be fitted to an arrival process such as the inhomogeneous Poisson process, with rate parameter modeled as a function of the predictors. In this model, predictors must be categorized as constant (e.g. demographics) or time-varying (e.g. smoking-related objects); and for time-varying predictors, either always observed (e.g. time of day) or partially observed (e.g. images). This model directly predicts smoking risk in terms of the probability that smoking will occur within a given time window based on the predictor variables. Goodness of fit may be assessed by approximating the likelihood function via Markov chain Monte Carlo.

Model Interpretation and Evaluation. Several indices will be calculated to quantify relationships between the predictors, including all smoking-related objects, and the predicted variables (e.g. smoking risk [Example 1]) and craving and stress/negative affect (Example 4). A discrimination index will be calculated by dividing model coefficients by the standard deviation of the corresponding predictor. Mutual information will also be used to quantify relationships between each pair of predictor/prediction variables. Finally, linear or Spearman correlation and other standard statistical indices will be calculated pairwise, as appropriate.

Models will be evaluated using three separate, nested cross-validation (CV) schemes, in which the inner CV is used to fix model hyperparameters and the outer CV is used to evaluate performance. Data will be partitioned (1) by participants to evaluate performance on previously unseen subjects and (2) by day to ensure models generalize longitudinally.

Example 3: Personalized Models

To establish personalized models, the inventors will personalize the prediction models from Example 1 by fine-tuning model parameters to individual participants. Although the Example 1 models incorporate demographics and other baseline variables, the corresponding model parameters are fixed. In contrast, model parameters for this Example will be permitted to vary between participants. Importantly, this includes parameters relating smoking-related objects to smoking risk. This Example is motivated by preliminary results suggesting that model performance may be limited by individual differences in preferred or typical smoking environments.

Two different personalization methods will be explored. First, mixed-effects modeling will be used to optimize prediction performance and allow model parameters to be easily interpreted to generate clinical knowledge. Then, online learning methods will be tested to assess the feasibility of real-time personalization in a JITAI.

Defining Personalization. In this work, personalization refers to relationships between predictors and predicted variables (outcomes), including smoking (Example 1) as well as craving and stress (Example 4). In the personalized models, the parameters associated with these relationships will be permitted to vary between participants. For example, a park bench might convey greater smoking risk in Participant A than in Participant B. Specifically, model parameters for AW-S objects, time of day, and day of the week will be allowed to vary between persons, whereas those for baseline variables will be held fixed. Note that the objects detector—the most complex portion of the overall framework—need not be personalized. This is an important advantage of our object-mediated approach.

Mixed-Effects Modeling. As a first method of personalization, the fixed-effects models described in Example 1 will be generalized to mixed-effects models with parameters for AW-S objects, time of day, and day of the week among the random effects. As before, L1 and L2 regularization will be explored to limit model variance and complexity. In particular, the time-series model of smoking risk will be personalized using a mixed-effects framework, in which the rate parameter of an arrival process depends on fixed effects (demographics and baseline variables), random effects with fully-observed predictors (time of day and day of week), and random effects with partially-observed predictors (AW-S objects).

Online Learning. As a second method of personalization, the fixed-effects models from Example 1 will be incrementally updated (i.e. online learning) with data collected during successive days of participation, so that personalization is achieved over the course of the acquisition phase. Beginning with a fixed-effects model trained on all other participants, an individual participant's model parameters will be repeatedly updated via stochastic gradient descent with batches of data acquired in each of the first 17 days.

Methodological refinements based on recent advances in online linear regression will be explored. Similar to Example 1, model evaluation will utilize data from days 18-21. This process will take place in the analysis phase, not in real-time; its goal is to establish the feasibility of real-time prediction, and to quantify rates of model convergence and performance gain.

These results will be critical to the design of a personalized JITAI based on this work.

The indices described in Example 1 will also be applied to the personalized models to describe relationships between pairs of predictor/prediction variables. Indices corresponding to random effects parameters will vary from person to person, so they will be presented via figures and standard summary statistics.

Example 4: Prediction of Craving and Stress/Negative Affect

In Example 3, the approaches outlined in Examples 1 and 2 were extended to the prediction of craving and negative affect/stress. The logistic regression models used for classification in Examples 1 and 2 will be replaced with multiple linear regression or ordered multiple logistic regression as appropriate for numeric and ordinal variables, respectively. These models will draw on the same set of predictor variables, including output of the objects detector, and will be evaluated and interpreted according to the previously outlined methods. Fixed-effects models will first be explored, followed by personalization via mixed-effects and online learning frameworks.

This exploratory aim is intended to a) generate impactful clinical knowledge, and b) facilitate JITAIs targeting the antecedents of smoking (e.g. craving and/or negative affect/stress) prior to the user entering a high-risk, smoking-related environment.

Example 5: Alternative Design Considerations

The systems and methods of the present disclosure have many possible alternative design configurations, all of which are within the scope of the present disclosure. For example, one possible embodiment comprises the use of Photo-EMA. In such an embodiment, the ultimately envisioned JITAI will take advantage of a wearable camera for acquiring images of everyday life. Though the release of Google Clip is anticipated soon, we determined that no other wearable cameras on the market currently met our standards for reliability and security. The proposed Photo-EMA approach is a step toward continuously streaming images; reevaluate the wearable camera landscape will be evaluated at study start and use any acceptable products.

It is recognized by the inventors that pre-quit smoking risk may not generalize to post-quit lapse risk. The inventors have considered staging a smoking cessation attempt and acquiring images of lapse-associate environments. However, in one study, smokers recorded an average of 5.7 lapse episodes over the course of 6 weeks. Even if the Photo-EMA protocol is extended to 6 weeks, it is anticipated that 342 lapse episodes versus the 8500 smoking episodes that are anticipated over the proposed 3-week period. EMA studies suggest that many of the antecedents to ad lib smoking are the same as smoking lapses (e.g. presence of other smokers, craving, negative affect) and intuitively, it is unlikely that smokers would seek out whole new classes of environments in which to lapse. As such, the inventors are confident that developed models will generalize.

Example 6: JITAI for Smoking Cessation App

Smokers report increased craving and tobacco use when viewing environments where they habitually smoke compared to environments where they do not, suggesting that these environments may contribute to lapses and relapse following a quit attempt. The results described in Example 1 demonstrated that smoking environments can be recognized with a deep learning approach, in which objects and settings in images of daily life are identified and used as individual predictors of smoking risk. This result suggests that images of daily environments can be used to support just-in-time adaptive interventions (JITAIs), or to identify specific environmental cues that may confer risk for smoking and potentially other target behaviors. Several modifications to the deep learning methodology were introduced and training the model on an expanded cohort of over 300 smokers from the Durham, N.C. and Pittsburgh, Pa. areas. The updated model is optimized for mobile devices, making it suitable for implementation as part of a digital health intervention. Additional methodological improvements include (a) expansion of the range of environmental objects and settings our model can identify, (b) a more flexible deep learning architecture that evaluates the number of objects per image and their importance to the image as a whole, and (c) a hierarchical, nonlinear approach to scene understanding and smoking risk prediction.

Figure 9:
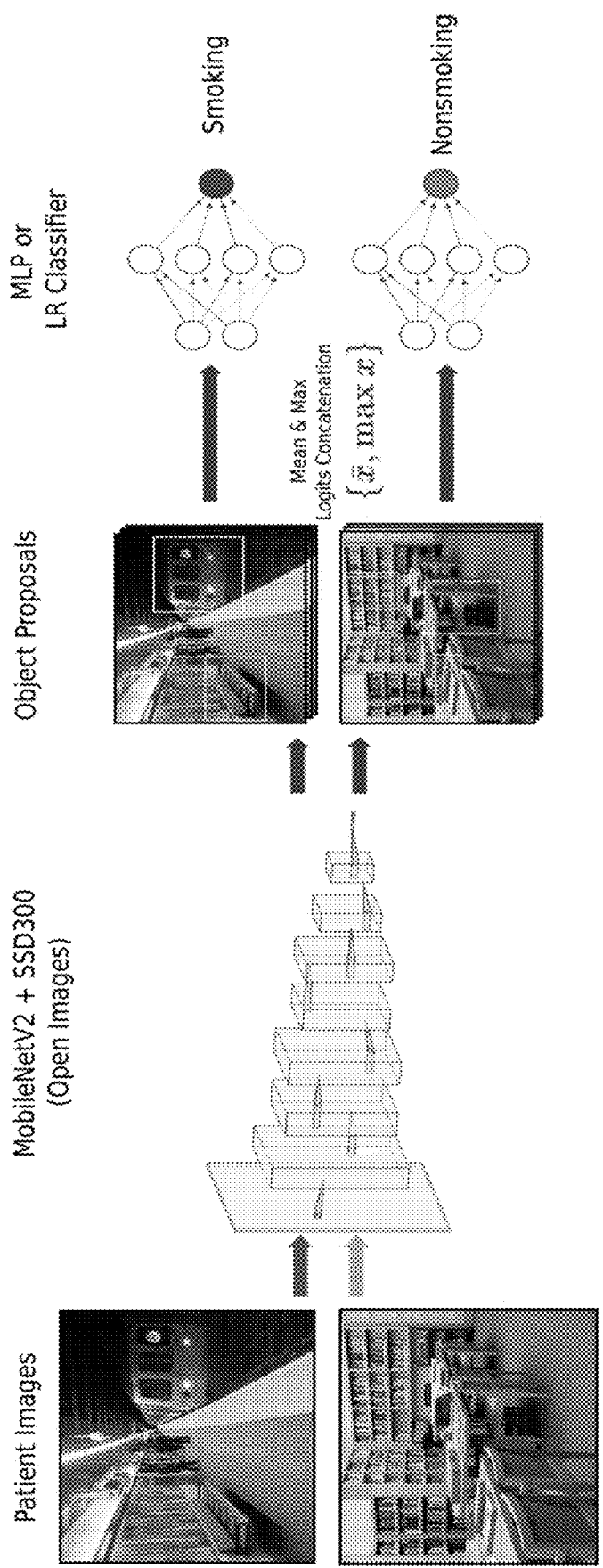
FIG. 9 is an illustration of the classification model, which extracts image features using a MobileNetV2 base architecture paired with an SSD object detector, the maximum and average logits for each detection class were calculated across all object proposals. This was then fed to a multi-layered perceptron (or logistic regression) to classify the images as a smoking environment or nonsmoking environment.
Figure 10:
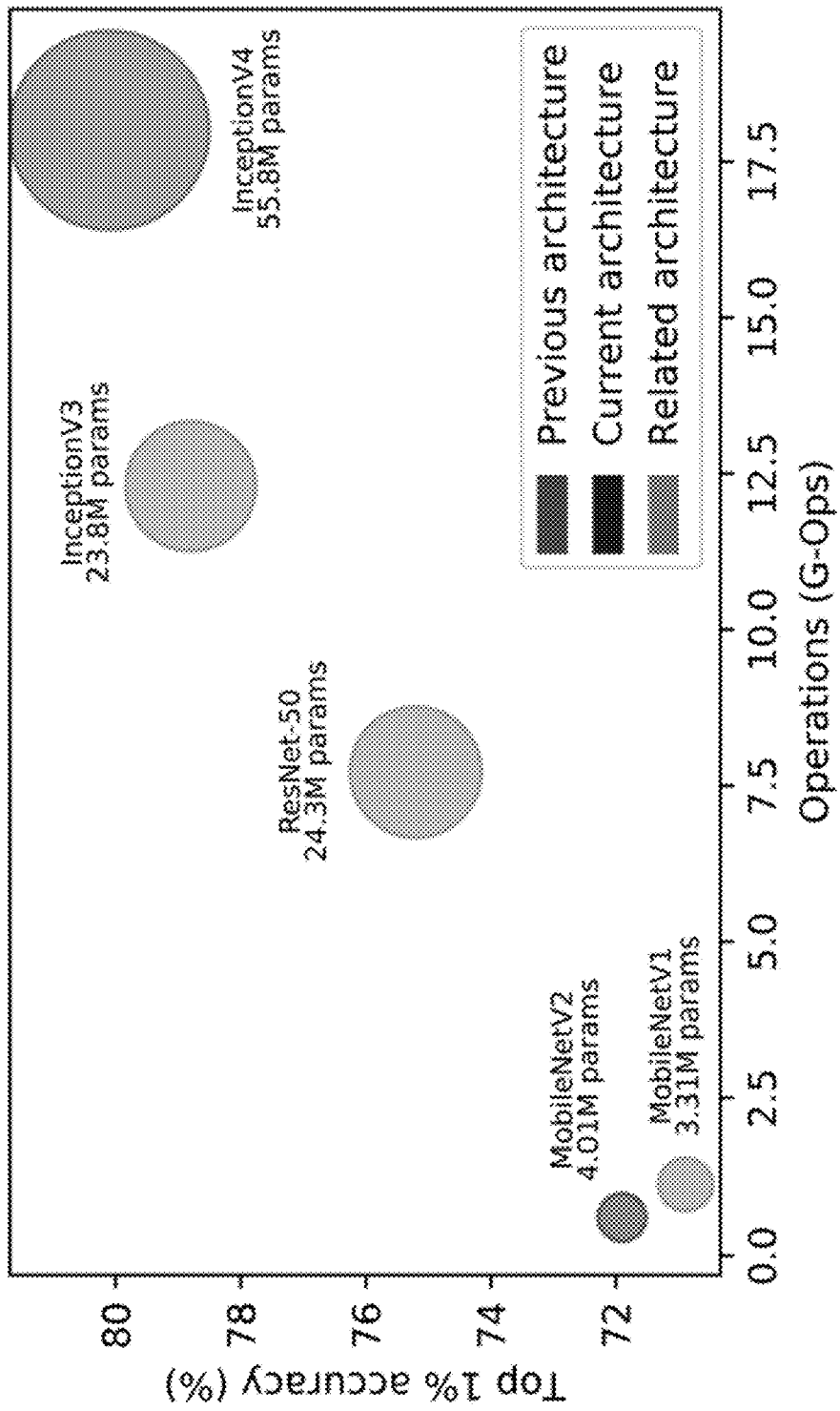
FIG. 10 is a representation showing base architecture accuracy, number of operations, and number of parameters. Changing from a base architecture of InceptionV4 to MobileNetV2 caused a drop in parameters by 10-fold, while maintaining reasonable accuracy. Demonstrating pictorially why real-time smoking risk prediction is becoming a feasible.

As part of longstanding research on environments and smoking, 169 adult (18-55) smokers (>5/day) from the Durham, N.C. (N=106) and Pittsburgh, Pa. (N=63) areas photographed ≤4 of their smoking environments and ≤4 nonsmoking environments. These images (N=2903) were used to train a deep learning model that predicts the probability of each location type (smoking/nonsmoking), which may then be used to approximate environment-based smoking risk. Our classifier is comprised of a light CNN (MobileNetV2) and object detection framework (Single Shot Detector) for feature extraction, with an interpretable logistic regression model or multi-layered perceptron at the output. It was trained and evaluated via nested cross-validation with respect to patients (i.e. out-of-patient prediction). To contextualize model performance, results were compared with the previous research described in Example 1. See FIG. 9 and FIG. 10.

Figure 11:
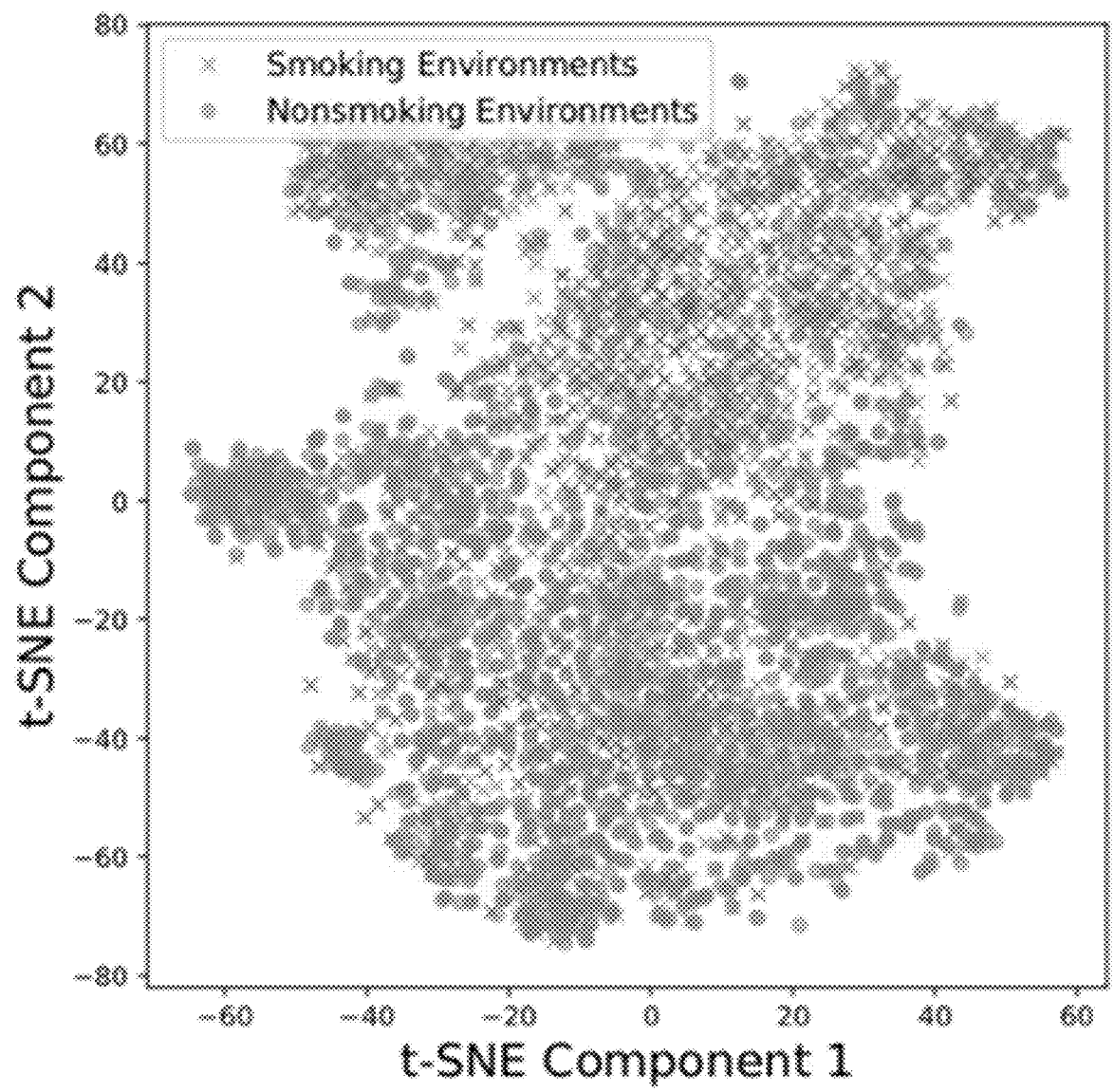
FIG. 11 is a two-dimensional representation, created using t-stochastic neighbor embedding (t-SNE), of the image content extracted by the deep CNN shows how images taken by participants cluster into distinct environment types. Some are more likely to be smoking environments, and others are more likely to be nonsmoking environments.
Figure 12:
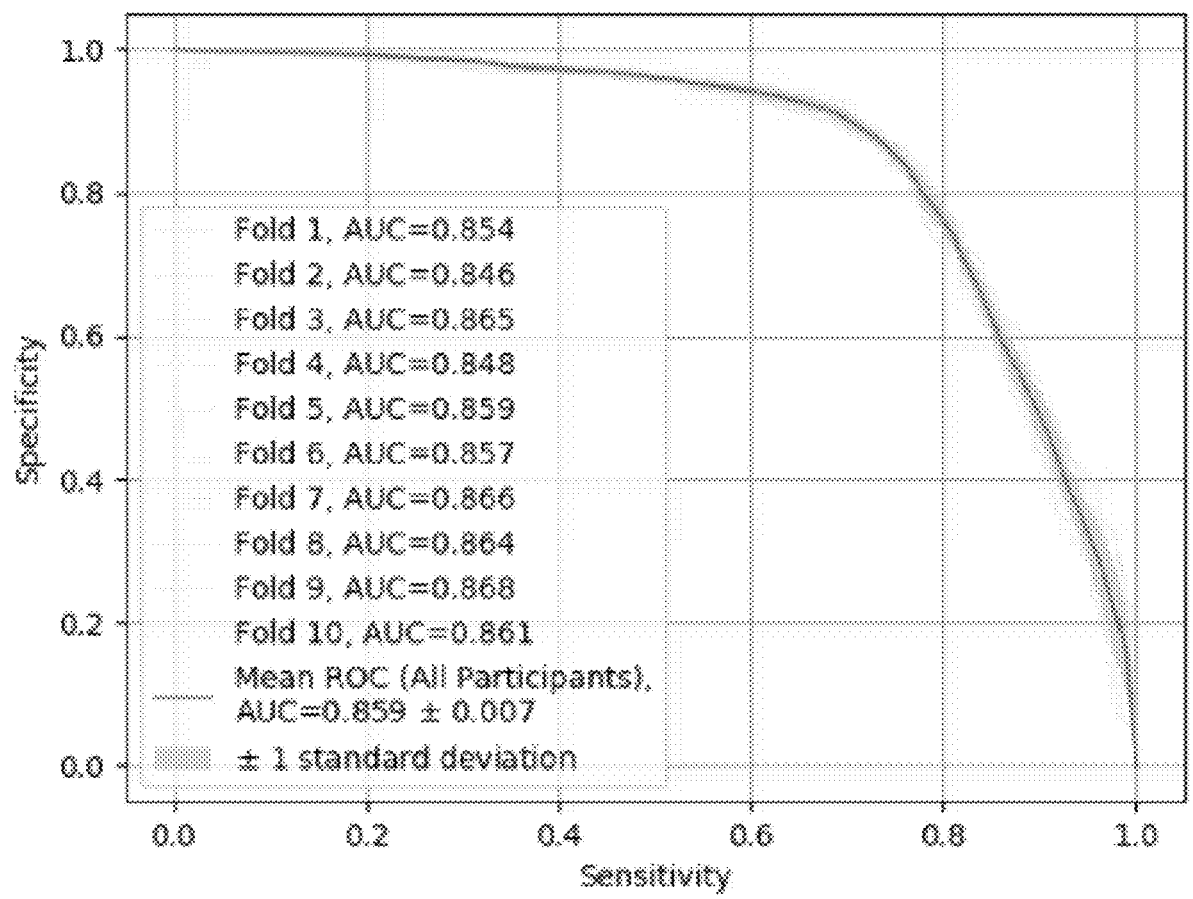
FIG. 12 is a graph showing out-of-sample predictive performance (sensitivity vs specificity) for the trained classifier. The left panel shows mean±SD of all results from cross-validation. Area under the curve (AUC) is 0.859±0.007, with accuracy of 73.0% at an 0.5 classification threshold.

FIG. 11 shows a two-dimensional representation of the image content extracted by MobileNetV2. The logistic regression variant discriminated environment types with 0.816 AUC (74.6% accuracy) and the single layer perception variant, consisting of 500 neurons, discriminated environment types with 0.859 AUC (73.0% accuracy) (FIG. 12). These improvements resulted in strong predictive performance similar to previous work while achieving a 10-fold reduction in model complexity (i.e., number of model parameters) and providing new information about the composition of daily environments in which participants smoke.

Models trained on geographically distinct subgroups performed equally well when evaluated on the same data (p>0.05), suggesting good generalizability. The object detection framework, therefore, resulted in strong predictive performance similar in AUC over previous work, while achieving a 10-fold reduction in model complexity (i.e., number of model parameters) and providing new information about the composition of daily environments in which participants smoke.

The results of this study demonstrate that object detection frameworks can improve identification of smoking environments and predict smoking risk by: identify and localizing environmental features associated with smoking behavior; predicting smoking risk associated with any image of daily life; and predicting risk in real time in order to trigger just-in-time, adaptive cessation interventions.

Additionally, the results showed good generalization across participants and geographic locations suggests that specific environmental patterns are consistently associated with smoking. Finally, determining how external environments affect other behaviors or symptoms facilitates environment-based interventions and therapeutic environment modifications.

Figure 13:
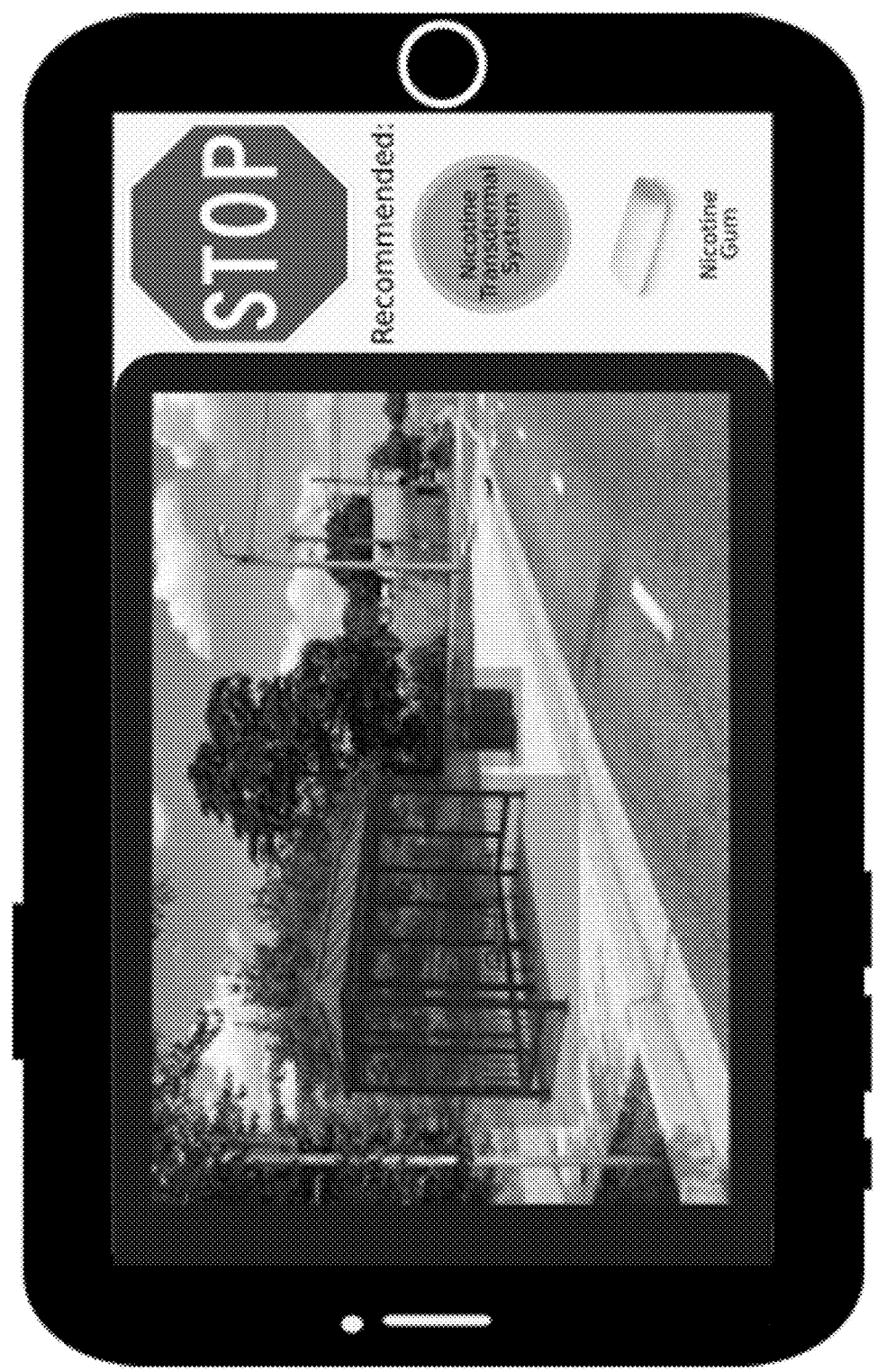
FIG. 13 is a representative predictive app. The combination of great model performance/generalizability due to the light object detection framework has made it feasible to pursue mobile app interventions. One example is shown, where the app could predict risk for any area the user photographs, and draws bounding boxes around object proposals most correlated with smoking. Suggestions can also be made if the user is in an area of high smoking risk.

In another embodiment, the systems and methods provided herein may further comprise a personalized JITAI for smoking cessation app (FIG. 13). Such an app would leverage everyday images and the models developed in this work to identify instances of high smoking risk and prompt subjects with warnings and behavioral interventions. To acquire images of everyday life without prompting participants to take pictures, the app will be linked to a wearable camera, such as the Google Clip. However, the systems and methods provided herein do not rely on acquiring images directly from participants themselves. The predictive models according to the present disclosure can be applied to images from any source, including publicly available data from Google Maps and similar services. This means that models developed in this research can predict smoking risk associated with locations the subject has not yet visited if an image of that location is available. Using this approach, a smoking cessation JITAI could preempt users from visiting known high-risk locations. More generally, the flexibility of the models opens the door for numerous future directions incorporating different image sources and/or acquisition paradigms and also other problem behaviors (e.g. alcohol use, binge eating).

Overall, this work demonstrates an improved approach to assessing environment-based risk, and represents an important step toward implementation of a JITAI that incorporates information about daily environments. This framework for interpreting and predicting the influence of environments on target behaviors provides a basis for environment-based interventions, with broad applications in mental and physical health.

Example 7: Envirotyping

With Apple now preparing to release augmented reality glasses, it appears that smart, connected eyewear will join smartwatches on the growing list of mainstream wearable devices. These technologies will be marketed as a way to superimpose digital objects on physical ones—for example, a virtual game of chess might be played on a physical tabletop—but for digital health, they represent a new, unprecedented opportunity. In order to augment reality, these devices must first observe and interpret it using front-facing cameras and computer vision, respectively. In doing so, they will give us access to a rich visual data stream, one that complements information about user actions and physiology provided by current wearable devices. Unlike existing digital health data streams, which focus primarily on the wearers themselves, these new data will provide information about the wearer's external world, as viewed from their perspective. For the first time, digital health researchers will have an effective, unobtrusive means of quantifying the environments in which study participants live and operate—and which shape their health and behavior.

The study of real-world health and behavioral status using technology has been called "digital phenotyping," wherein data are passively and continuously captured from smartphones and connected sensors. Insel T R (2017) *Jama*, 318(13):1215. Through this process, wearable technologies might assess the wearer's sleep, quantify device use and other behaviors, or even detect cardiovascular and neurological events. What typically goes unmeasured, however, is the environmental context surrounding these phenomena, information that is needed to understand their antecedents, and to design and deliver context-appropriate interventions. Without this context, panic attacks (e.g. via heart rate and skin conductance sensors) might be detected, but without identifying the social environments that consistently trigger them. Sedentary behavior and weight gain (e.g. from accelerometers and smart scales) might be observed, but without recognizing how an obesogenic work, home, or neighborhood environment discourages physical activity and healthy eating. For instance, it was found that personal environments associated with smoking elicit urge and increase smoking behaviors. Mcclernon F J et al., (2015) Neuropsychopharmacology, 41(3):877-885. Moreover, emerging evidence suggests that many smokers spend the majority of their time in pro-smoking environments, which may have substantial influence on their ability (or inability) to quit. When interpreting health and behavior, the environment matters.

Digital health tools have a critical role to play in quantifying individual phenotypes, defined as an individual's observable characteristics, in naturalistic settings and with greater detail and precision. Less recognized but equally compelling, however, is these tools' potential to quantify individual envirotypes, defined as the characteristics of the environments in which the individual functions, and which in turn influence their phenotype. The term envirotype, originally borrowed from the ecology literature, has previously been used to conceptualize environmental factors affecting phenotypic variability in plant growth, and in a mouse model. Beckers J, et al. (2009) *Nature Reviews Genetics*. 10(6):371-380. In medicine, the dual influence of genetic and environmental factors on individual phenotypes is universally accepted, but the former have received greater attention partly due to technological advances in genotyping.

The phenotyping capabilities of mobile sensing technologies have rapidly expanded and improved, but thus far their envirotyping capabilities have been quite limited. Detailed information about the wearers themselves is collected using a variety of modalities: accelerometers track physical activity, photoplethysmography is used to estimate heart rate and pulse pressure, skin conductance serves as a proxy for physiologic arousal, and device use and other behavioral data are recorded. Mohr D C, et al. (2017) *Annual Review of Clinical Psychology.* 13(1):23-47. In contrast, the predominant source of information about the wearer's external environment has been GPS data. While valuable for assessing overarching movement and activity patterns, GPS coordinates do not capture the wearer's experience at a given location, which depends on their viewpoint as well as social and other conditions at the time. GPS might tell you that an individual is at a grocery store, but not which aisles they visited, which product displays they viewed and for how long, or who else was there, all of which are critical in understanding how retail environments affect food purchasing decisions. Wearable cameras, on the other hand, provide direct information about the wearer's environment, from their perspective. Importantly, this data stream can be processed and interpreted with deep learning (i.e., convolutional neural networks) or other techniques, reducing or eliminating the need for manual review. Moreover, mobile-optimized deep learning models can already process images in real time on mobile hardware, allowing them to be utilized in a real-time, adaptive intervention.

As new envirotyping technologies emerge, a number of known, environment-related health risks can be targeted by early envirotyping initiatives. Smart eyewear can be leveraged to more precisely describe how contact with residential green space influences mental health risk (Gascon M, et al. (2015) *International Journal of Environmental Research and Public Health.* 12(4):4354-4379), or how living near fast food and tobacco retail outlets increases daily exposure to advertising, thereby increasing obesity and smoking risk, respectively. When these and other environmental risks have been studied to date, environment characteristics have typically been aggregated by neighborhood or geographic area. This approach measures study participants' access to salient environmental features rather than exposure itself, which may vary widely between individuals even within the same household. Studies of obesogenic environments have illustrated this limitation: self-reported and objectively measured neighborhood characteristics tend to differ, and it is the self-reported characteristics that correlate more strongly with obesity status. Kirk S F, et al. (2010) *Obesity Reviews.* 11(2):109-117. In contrast, vision-based methods will empower future envirotyping studies by precisely, objectively quantifying exposure to environmental risk factors among individual study participants. Moreover, this strategy will allow daily environments to be characterized in unprecedented detail, thereby facilitating discovery of unknown, and perhaps unexpected, environmental determinants of health and well-being.

The coupling of smart eyewear and computer vision represent a technological turning point, one that calls for a more comprehensive, ambitious study of environments and health. For the first time, there is a practicable method to collect and analyze environmental exposures on an individual basis, yet at scale. As envirotyping technologies emerge and mature, the digital health field must prepare to take advantage of them with new, large-scale digital envirotyping initiatives, or by adding image acquisition and analysis to existing digital health initiatives such as All of Us and Project Baseline. Characterizing environmental determinants of health and behavior is an important first step toward a broader science that will include environment modification and environment-centered intervention. Labeling this process envirotyping aims emphasize its importance and connect geno-, pheno-, and enviro-typing efforts to more comprehensively and holistically understand and improve human health.

Any patents or publications mentioned in this specification are indicative of the levels of those skilled in the art to which the disclosure pertains. These patents and publications are herein incorporated by reference to the same extent as if each individual publication was specifically and individually indicated to be incorporated by reference. In case of conflict, the present specification, including definitions, will control.

One skilled in the art will readily appreciate that the present disclosure is well adapted to carry out the objects and obtain the ends and advantages mentioned, as well as those inherent therein. The present disclosure is presently representative of embodiments, are exemplary, and are not intended as limitations on the scope of the invention. Changes therein and other uses will occur to those skilled in the art which are encompassed within the spirit of the disclosure as defined by the scope of the claims.

The invention claimed is:

1. A system comprising:
a camera configured to generate image data; and
a computing device in electronic communication with the camera, the computing device comprising at least one processor, wherein the computing device is configured to:
receive, from the camera, one or more images representative of a location;
apply a trained classifier to the one or more images to classify the location into one of at least two risk categories, wherein the classification is based on a likelihood of a subject performing a target behavior based on presence of the subject in the location, wherein the target behavior comprises smoking and wherein the trained classifier comprises a convolutional neural network trained to identify one or more objects in the one or more images, and wherein the trained classifier differentiates between a first risk category indicative of a smoking environment and a second risk category indicative of a nonsmoking environment with an accuracy greater than 70%; and
issue a risk alert responsive to the trained classifier classifying the location into a high-risk category, wherein the risk alert comprises one or more of an audible alert, a visual alert, or a tactile alert.

2. The system according to claim 1, wherein the target behavior comprises one or more of anxiety, eating disorders, falling, insomnia, ADHD, obsessive compulsive disorder, sensory integration disorder, eating behavior, physical activity, or alcoholism.

3. The system according to claim 1, wherein the trained classifier further comprises an interpretable linear classifier trained to generate a risk index based on the one or more identified objects in the one or more images, wherein the location is classified into a risk category based on the risk index.

4. The system according to claim 1, wherein the system comprises a display interface configured to display an image of the location with at least one identified object highlighted to indicate an association between the at least one identified object and the target behavior.

5. The system according to claim 1, wherein the trained classifier comprises a decision tree.

6. The system according to claim 1, wherein the trained classifier is further trained to distinguish between a first category of high-risk locations in which the subject is at risk of performing the target behavior while present in one of the first category of high-risk locations and a second group of high-risk locations in which the subject is at risk of performing the target behavior subsequent to being present in one of the second category of high-risk locations.

7. The system according to claim 1, wherein the computing device is a wearable computing device and wherein the camera is physically coupled to the wearable computing device.

8. The system according to claim 1, wherein the at least one processor is configured to issue the risk alert responsive to the trained classifier classifying the location into the high-risk category based on the trained classifier classifying the location into the high-risk category for each image of a predetermined threshold number of images.

9. The system according to claim 1, wherein the computing device is further configured to:
determine whether the subject performed the target behavior in the location; and
further train the classifier based on the determination whether the subject performed the target behavior in the location.

10. The system according to claim 9, further comprising one or more sensors in electronic communication with the computing device, wherein the computing device is configured to determine whether the subject performed the target behavior in the location based on sensor data from the one or more sensors.

11. The system according to claim 1, wherein the computing device is further configured to provide at least one behavioral recommendation to reduce risk of the subject performing the target behavior.

12. The system according to claim 11 in which the at least one behavioral recommendation to reduce the risk of the subject performing the target behavior comprises one or more of: utilizing a behavioral coping strategy, engaging in an alternate behavior, reconfiguring the location to reduce risk, leaving the location, utilizing a therapy aid, or contacting a support individual.

13. The system according to claim 1, wherein the trained classifier is further trained to classify the location based on a likelihood of a subject having a physiological event based on presence of the subject in the location.

14. The system according to claim 13, wherein the physiological event comprises one or more of an asthma attack, seizures, an allergic reaction, high blood pressure, or a stroke.

15. A method comprising:
receiving, from a camera, one or more images representative of a location;
applying a trained classifier to the one or more images to classify the location into one of at least two risk categories,
wherein the classification is based on a likelihood of a subject performing a target behavior based on presence of the subject in the location,
wherein the target behavior comprises smoking and wherein the trained classifier comprises a convolutional neural network trained to identify one or more objects in the one or more images, and
wherein the trained classifier differentiates between a first risk category indicative of a smoking environment and a second risk category indicative of a nonsmoking environment with an accuracy greater than 70%; and
issuing a risk alert responsive to the trained classifier classifying the location into a high-risk category, wherein the risk alert comprises one or more of an audible alert, a visual alert, or a tactile alert.

16. A mobile computing device comprising:
a camera configured to generate one or more images representative of a location of the mobile computing device; and
a non-transitory computer-readable medium comprising program instructions executable by at least one processor to cause the at least one processor to:
  apply a trained classifier to the one or more images to classify the location into one of at least two risk categories,
  wherein the classification is based on a likelihood of a subject performing a target behavior based on presence of the subject in the location,
  wherein the target behavior comprises smoking and wherein the trained classifier comprises a convolutional neural network trained to identify one or more objects in the one or more images, and
  wherein the trained classifier differentiates between a first risk category indicative of a smoking environment and a second risk category indicative of a nonsmoking environment with an accuracy greater than 70%; and
issue a risk alert responsive to the trained classifier classifying the location into a high-risk category, wherein the risk alert comprises one or more of an audible alert, a visual alert, or a tactile alert.

* * * * *